US012718557B2

(12) United States Patent
Shomin et al.

(10) Patent No.: US 12,718,557 B2
(45) Date of Patent: Aug. 25, 2026

(54) METHOD FOR DETECTING AND RESPONDING TO CONDITIONS WITHIN A FOREST

(71) Applicant: Treeswift Inc., Philadelphia, PA (US)

(72) Inventors: Michael Shomin, Philadelphia, PA (US); Steven Chen, Philadelphia, PA (US); James Paulos, Philadelphia, PA (US)

(73) Assignee: Treeswift Inc., Philadelphia, PA (US)

(*) Notice: Subject to any disclaimer, the term of this patent is extended or adjusted under 35 U.S.C. 154(b) by 300 days.

(21) Appl. No.: 18/391,393

(22) Filed: Dec. 20, 2023

(65) Prior Publication Data

US 2024/0119730 A1 Apr. 11, 2024

Related U.S. Application Data

(63) Continuation-in-part of application No. 18/199,870, filed on May 19, 2023, and a continuation-in-part of (Continued)

(51) Int. Cl.
*G06V 20/10* (2022.01)
*G06T 7/70* (2017.01)

(Continued)

(52) U.S. Cl.
CPC .............. *G06V 20/188* (2022.01); *G06T 7/70* (2017.01); *G06T 7/73* (2017.01); *G06T 7/75* (2017.01);

(Continued)

(58) Field of Classification Search
CPC ...... G06V 20/188; G06V 20/52; G06V 20/13; G06V 20/17; G06V 20/647; G06V 10/16;

(Continued)

(56) References Cited

U.S. PATENT DOCUMENTS 9,922,398 B1 * 3/2018 Jenny ........................ G06T 7/20
9,984,455 B1 * 5/2018 Fox ....................... B64C 31/024

(Continued)

OTHER PUBLICATIONS

Bienert, Anne et al. "Automatic extraction and measurement of individual trees from mobile laser scanning point clouds of forests", Jul. 7, 2021, Annals of Botany, vol. 128, No. 6, pp. 787-804. <DOI: 10.1093/aob/mcab087>. (Year: 2021).*

(Continued)

*Primary Examiner* — Matthew C Bella
*Assistant Examiner* — Nicholas John Helco
(74) *Attorney, Agent, or Firm* — Run8 Patent Group, LLC; Peter Miller; Madison Tyrcha

(57) ABSTRACT

One variation of a method includes: detecting a first location of a user carrying a mobile pack proximal a first scan zone; accessing a first sequence of images representing trees in the first scan zone; characterizing a first coverage density of the first scan zone based on visual features detected in the first sequence of images; in response to the first coverage density exceeding a threshold coverage density, alerting the user of scan completion; detecting a second location of the user proximal a second scan zone; accessing a second sequence of images representing trees in the second scan zone; characterizing a second coverage density of the second scan zone based on visual features detected in the second sequence of images; and, in response to the second coverage density falling below the threshold coverage density, prompting the user to increase a traversal speed for a third scan zone.

20 Claims, 6 Drawing Sheets

Related U.S. Application Data application No. 18/199,863, filed on May 19, 2023, now Pat. No. 12,444,133.

(60) Provisional application No. 63/446,255, filed on Feb. 16, 2023, provisional application No. 63/434,773, filed on Dec. 22, 2022, provisional application No. 63/343,979, filed on May 19, 2022.

(51) Int. Cl.

*G06T 7/73* (2017.01)
*G06V 10/10* (2022.01)
*G06V 20/13* (2022.01)
*G06V 20/64* (2022.01)

(52) U.S. Cl.

CPC .............. *G06V 10/16* (2022.01); *G06V 20/13* (2022.01); *G06V 20/647* (2022.01); *G06T 2207/10032* (2013.01); *G06T 2207/30181* (2013.01); *G06T 2207/30188* (2013.01); *G06T 2207/30204* (2013.01)

(58) Field of Classification Search

CPC .... G06V 10/70; G06V 10/764; G06T 7/0002; G06T 1/0007; G06T 1/0014; G06T 3/4038; G06T 7/174; G06T 7/10; G06T 7/194; G06T 7/246; G06T 7/251; G06T 7/292; G06T 7/344; G06T 7/38; G06T 7/55; G06T 7/62; G06T 7/70; G06T 7/73; G06T 7/75; G06T 2207/10016; G06T 2207/10028; G06T 2207/10032; G06T 2207/20081; G06T 2207/20084; G06T 2207/20221; G06T 2207/30181; G06T 2207/30188; G06T 2207/30204; G06T 2207/30244; G06T 2207/30242; G06T 17/05

See application file for complete search history.

(56) References Cited

U.S. PATENT DOCUMENTS

| | | | | |
|---|---|---|---|---|
| 2019/0051046 | A1* | 2/2019 | Jin | G08G 5/26 |
| 2020/0019777 | A1* | 1/2020 | Gurzoni, Jr. | G06V 10/803 |
| 2020/0029490 | A1* | 1/2020 | Bertucci | G05D 1/0274 |
| 2021/0232818 | A1* | 7/2021 | Saxena | G06N 3/0464 |
| 2022/0044475 | A1* | 2/2022 | Tham | G05D 1/0016 |
| 2024/0193938 | A1* | 6/2024 | Harikumar | G06V 20/194 |

OTHER PUBLICATIONS

Liang, Xinlian et al. “Forest Data Collection Using Terrestrial Image-Based Point Clouds From a Handheld Camera Compared to Terrestrial and Personal Laser Scanning”, Sep. 2015, IEEE Transactions on Geoscience and Remote Sensing, vol. 53, No. 9, pp. 5117-5132. <DOI: 10.1109/TGRS.2015.2417316>. (Year: 2015).*

* cited by examiner

METHOD FOR DETECTING AND RESPONDING TO CONDITIONS WITHIN A FOREST

CROSS-REFERENCE TO RELATED APPLICATIONS

This Application claims the benefit of U.S. Provisional Application No. 63/434,773, filed on 22 Dec. 2022, and 63/446,255, filed on 16 Feb. 2023, each of which is incorporated in its entirety by this reference.

This Application is a continuation-in-part application of U.S. patent application Ser. No. 18/199,863, filed on 19 May 2023, and Ser. No. 18/199,870, filed on 19 May 2023, which claim the benefit of U.S. Provisional Application No. 63/343,979, filed on 19 May 2022, each of which is incorporated in its entirety by this reference.

TECHNICAL FIELD

This invention relates generally to the field of forestry and more specifically to a new and useful method for autonomously detecting and responding to conditions within a forest in the field of forestry.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHOD

Figure 1:
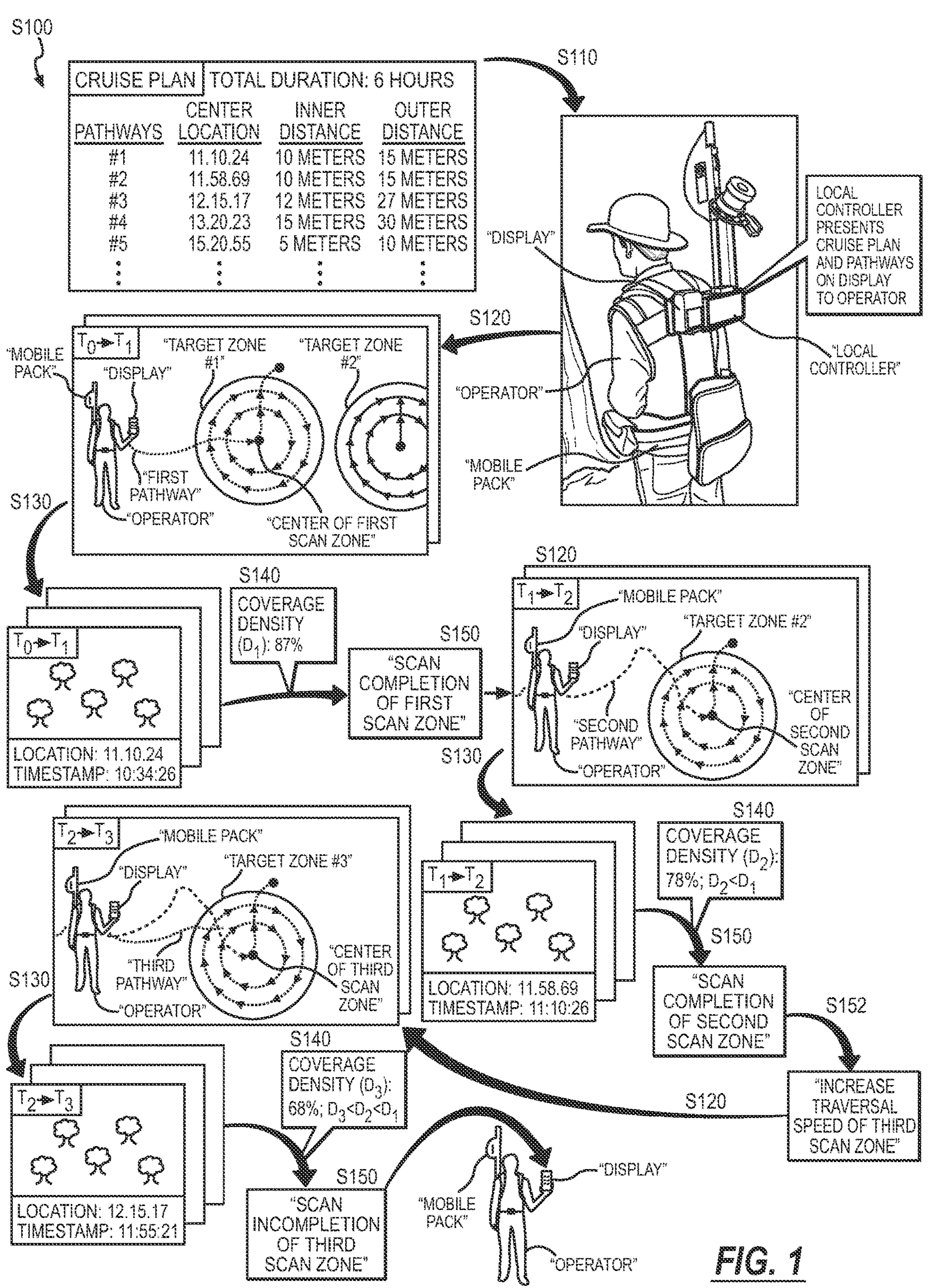
FIG. 1 is a flowchart representation of a method.

As shown in FIG. 1, a method S100 for detecting and responding to conditions within a forest includes, at a mobile pack, accessing a target pathway for a user, the target pathway intersecting an array of scan zones within a stand of trees in Block S110 and during a first time period: detecting a first location of the user proximal a first scan zone in Block S120; by a set of optical sensors arranged in the mobile pack, capturing a first sequence of images representing a first set of trees in the first scan zone, while the user navigates along the target pathway proximal the first location in Block S130; characterizing a first coverage density of the first scan zone based on visual features detected in the first sequence of images in Block S140; and, in response to the first coverage density exceeding a threshold coverage density, alerting the user of scan completion of the first scan zone in Block S150.

The method S100 further includes, during a second time period: detecting a second location of the user proximal a second scan zone in Block S120; by the set of optical sensors, capturing a second sequence of images representing a second set of trees in the second scan zone, while the user navigates along the target pathway proximal the second location in Block S130; characterizing a second coverage density of the second scan zone based on visual features detected in the second sequence of images in Block S140; and, in response to the second coverage density falling below the threshold coverage density and exceeding a second threshold coverage density less than the first threshold coverage density, prompting the user to increase a speed of traversal along the target pathway for a subsequent scan zone in Block S152.

The method S100 also includes, during a third time period: detecting a third location of the user proximal the third scan zone in Block S120; by the set of optical sensors, capturing a third sequence of images representing a third set of trees in the third scan zone, while the user navigates along the target pathway proximal the third location in Block S130; characterizing a third coverage density of the third scan zone based on visual features detected in the third sequence of images in Block S140; and, in response to the third coverage density falling below the second threshold coverage density, prompting the user to re-traverse a segment of the target pathway for a second scan of the third scan zone Block S154.

1.1 Variation: Virtual Representation of Tree Characteristics

Figure 2A:
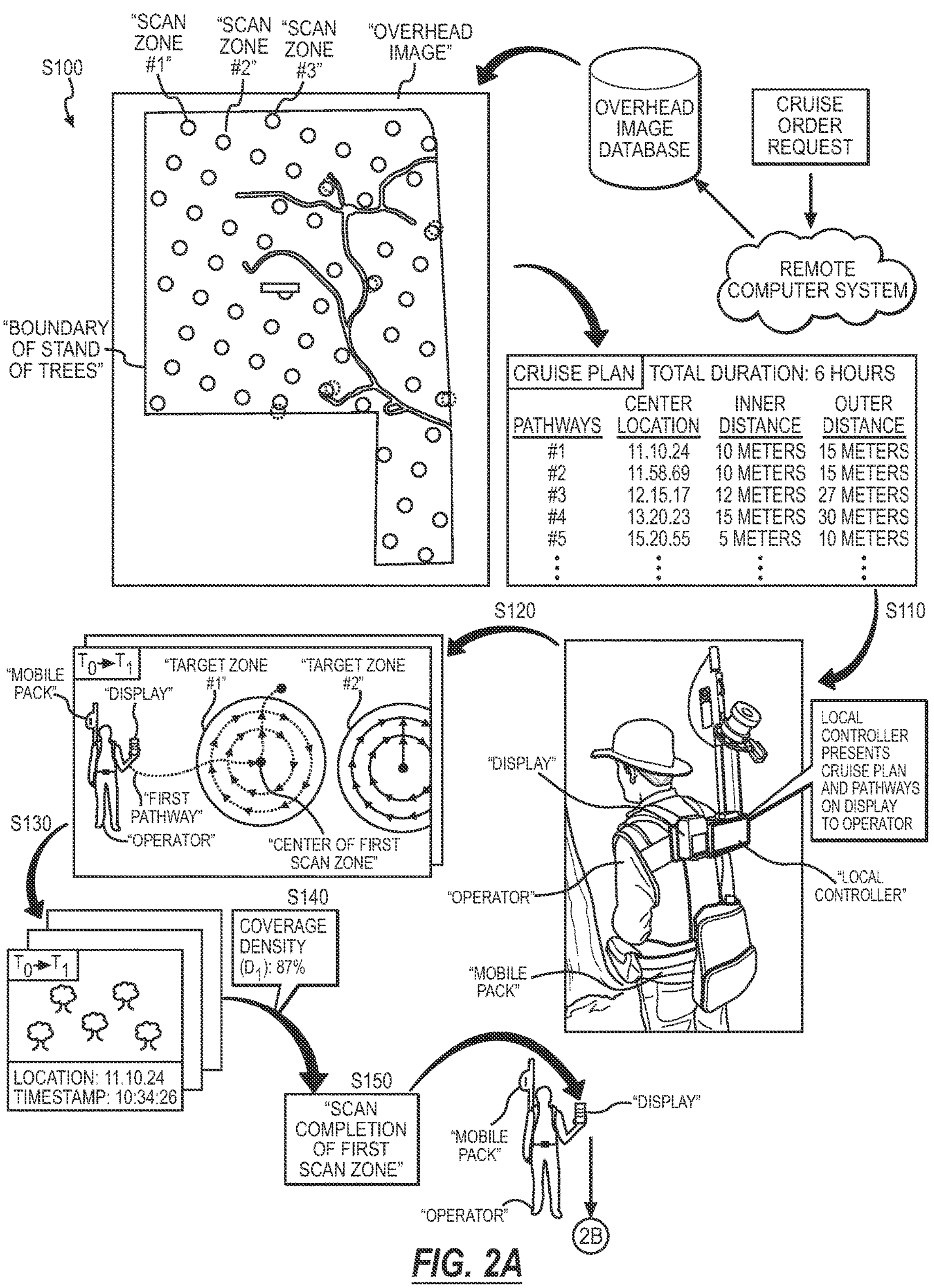
FIGS. 2A, 2B, and 2C are flowchart representations of one variation of the method.
Figure 2B:
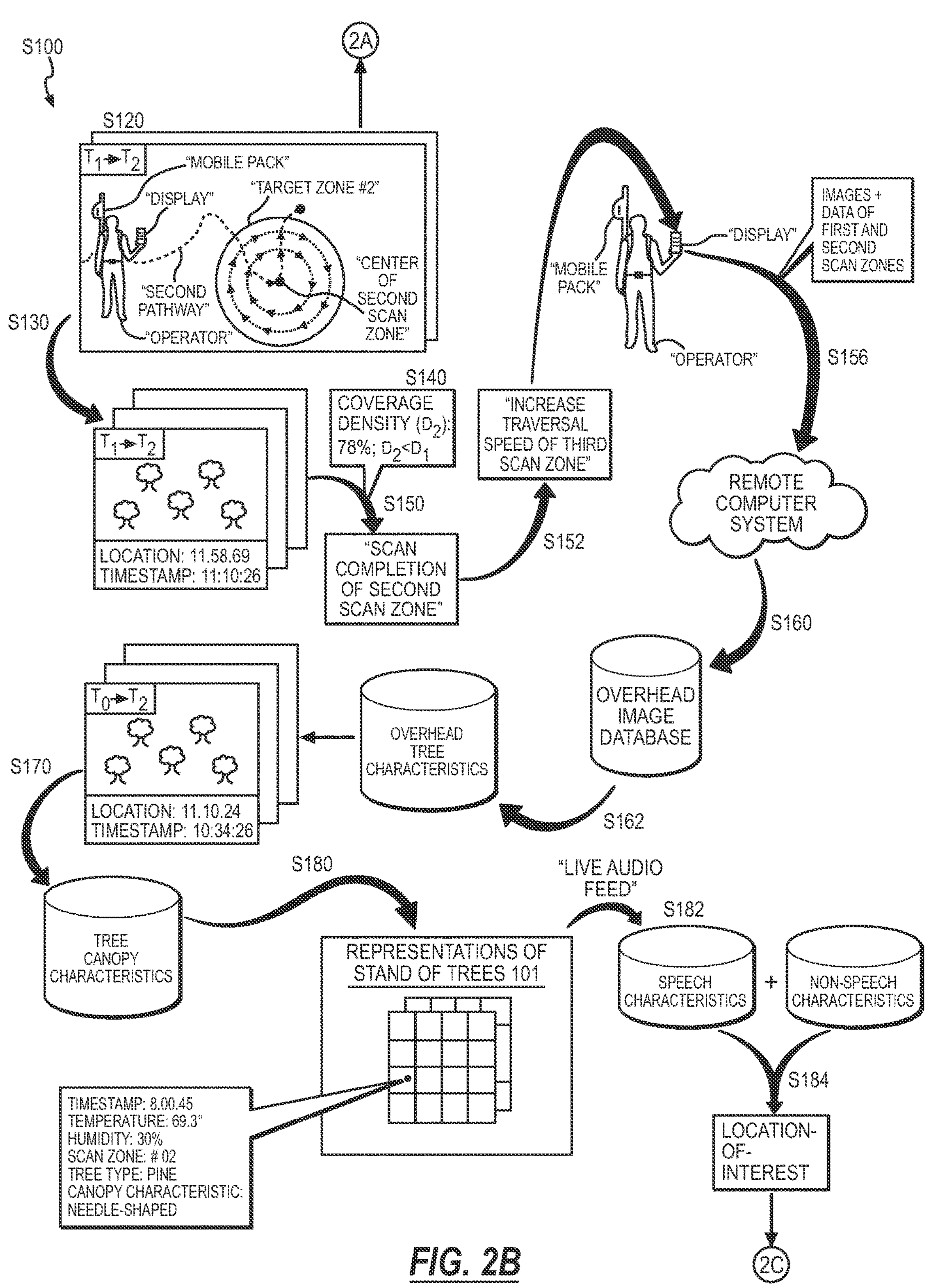

As shown in FIGS. 2A and 2B, one variation of the method S100 includes, during a first time period, at a mobile pack: detecting a first location of a user carrying the mobile pack proximal a first scan zone in Block S120; recording a first sequence of images at a set of optical sensors arranged within the mobile pack, the first sequence of images representing a first set of trees in the first scan zone in Block S130; characterizing a first coverage density of the first scan zone based on visual features detected in the first sequence of images in Block S140; and, in response to the first coverage density exceeding a threshold coverage density, alerting the user of scan completion of the first scan zone in Block S150.

This variation of the method S100 further includes, during a second time period at the mobile pack: detecting a second location of the user proximal a second scan zone in Block S120; recording a second sequence of images representing a second set of trees in the second scan zone at the set of optical sensors in Block S130; characterizing a second coverage density of the second scan zone based on visual features detected in the second sequence of images in Block S140; and, in response to the second coverage density falling below the threshold coverage density, prompting the user to increase a speed along a segment of a pathway for a subsequent scan zone in Block S152.

The method S100 also includes, during a third time period at a computer system: accessing an overhead image of the stand of trees in Block S160; detecting a set of overhead tree characteristics of the stand of trees based on visual features detected in the overhead image in Block S162; interpolating a first set of tree canopy characteristics of a fourth set of trees between the first scan zone and the second scan zone based on visual features detected in the first sequence of images and the second sequence of images in Block S170; and compiling the set of overhead tree characteristics of the stand of trees and the first set of tree canopy characteristics into a virtual representation of tree characteristics across the stand of trees in Block S180.

1.2 Variation: Real-Time Feedback for User

One variation of the method S100 includes, during a first time period: detecting a first location of a user carrying a mobile pack proximal a first scan zone in Block S120; accessing a first sequence of images representing a first set of trees in the first scan zone and captured by a set of optical sensors arranged within the mobile pack in Block S130; characterizing a first coverage density of the first scan zone based on visual features detected in the first sequence of images in Block S140; and, in response to the first coverage density exceeding a threshold coverage density, generating a notification to alert the user of scan completion of the first scan zone in Block S150.

This variation of the method S100 further includes, during a second time period: detecting a second location of the user proximal a second scan zone in Block S120; accessing a second sequence of images representing a second set of trees in the second scan zone and captured by the set of optical sensors in Block S130; characterizing a second coverage density of the second scan zone based on visual features detected in the second sequence of images in Block S140; and, in response to the second coverage density falling below the threshold coverage density, prompting the user to increase a traversal speed for a subsequent scan zone in Block S152.

2. APPLICATIONS

Generally, Blocks of the method S100 can be executed by a local controller arranged within a mobile pack in conjunction with an operator carrying the mobile pack and a remote computer system: to extract optical data (e.g., images of a stand of trees), non-optical data (e.g., ambient data, geospatial data, audio data), metrics and insights of a forest; to provide (near) real-time feedback and/or guidance to the operator during a manual cruise of the stand of trees (i.e., the operator traverses a target pathway through a stand of trees while carrying the mobile pack); and to derive a two-dimensional or three-dimensional representation of the stand of trees, such as indicating both detected and interpolated locations, species, sizes, foliage density, health, and/or pest infestation of individual trees present throughout the stand of trees.

More specifically, the remote computer system can: receive a cruise order request from a user (e.g., an owner or stand manager affiliated with a forest); define a target pathway intersecting an array of scan zones within the stand of trees or a set of elliptical pathways for each scan zone; generate a cruise plan defining a sequential order of elliptical pathways around groups of trees within the stand (e.g., a sequence of elliptical pathways for an operator to navigate along to traverse multiple scan zones within the stand of trees); and transmit the cruise plan to the local controller within a mobile pack, which interfaces with an operator via a display (e.g., a computing device arranged in the mobile pack or a mobile device carried by the operator and wirelessly connected to the mobile pack) to present the cruise plan to the operator, autonomously monitor cruise plan progress as the operator navigates along the elliptical pathways through each scan zone in the stand of trees, and to provide real-time data collection feedback to the operator.

Furthermore, during the cruise plan, the local controller can detect deviations between planned and actual progress of the operator while navigating along each elliptical pathway, such as: deviation of the operator's trajectory from the defined elliptical pathway; deviation of a quantity or quality of images collected by the operator and minimum image quantities or qualities defined in the cruise plan; or deviation of coverage of the stand of trees by data captured via the mobile pack and a predefined minimum coverage threshold.

Accordingly, the local controller can automatically generate an updated pathway, including a speed of traversal and a distance from a center of the scan zone, and serve a prompt to the operator (e.g., via the display arranged in the mobile pack) to traverse a subsequent scan zone defined in the cruise plan and/or re-traverse a segment of the elliptical pathway for the scan zone for a second scan attempt. The local controller can also generate a two-dimensional map of each scan zone and present this two-dimensional map to the operator between each segment of the cruise plan. Therefore, the local controller can enable the operator to timely and efficiently navigate a set of elliptical pathways through the forest to complete a cruise plan and review the two-dimensional map of the stand of trees between scan zones within the forest.

Once the cruise plan is complete (e.g., post-cruise), the remote computer system can: derive a three-dimensional representation of the forest; extract metrics such as locations, sizes, and characteristics (e.g., height, carbon volume, health, pest pressure) of the stand of trees within the forest; and present these metrics to the user (e.g., owner or stand manager affiliated with the forest) within a user portal to enable the user to develop informed decisions (e.g., harvest times, pest mitigation strategies, fire risk mitigation) regarding a stand of trees within the forest.

2.1 Virtual Experiences

Additionally, the remote computer system can cooperate with the local controller to access an audio feed via a sensor suite arranged in the mobile pack and extract human speech characteristics and non-human speech characteristics (e.g., a birdsong, water rushing, tree branches in the wind) from the audio feed in order to detect location-of-interests in each scan zone. The remote computer system can highlight a corresponding location in each scan zone in the three-dimensional representation of the stand of trees as the location-of-interest and annotate the location-of-interest with corresponding segments of the audio feed.

Thus, the remote computer system can transform the three-dimensional representation of the stand of trees and each location-of-interest into a virtual video experience for each scan zone in the stand of trees and present the virtual video experience for each scan zone—including a segment of the audio feed associated with each scan zone—to the user associated with the cruise order request within the user portal.

3. SYSTEM

Generally, the method S100 can be executed by one or more elements within the system in conjunction with a remote computer system to detect and respond to conditions within a forest. The system includes: a mobile pack; a local controller; and a user interface.

More specifically, the remote computer system can: access satellite or aerial images of a stand of trees within the forest; project an array of scan zones onto the aerial image; and generate a cruise schedule (or "plan") defining a set of pathways through the array of scan zones for a user (e.g., an operator, stand manager, stand owner) carrying the mobile pack to traverse and scan trees (e.g., record optical data and non-optical data of trees) within each scan zone. In particular, the local controller can access these optical data and non-optical data from the mobile pack while the user traverses a particular pathway and manipulate these data to provide real-time feedback to the operator and generate a two-dimensional map of the stand of trees in (near) real-time.

Additionally, the remote computer system can access these optical data and non-optical data from the local controller and manipulate these data to derive a virtual representation of tree characteristics across the stand of trees and derive a three-dimensional representation of the stand of trees. The remote computer system can further extract metrics from the three-dimensional representation of the stand of trees—such as tree count, species, timber volume, and/or health metrics—and present these metrics to a user (e.g., a stand manager, an owner) within a user portal.

3.1 Mobile Pack

Figure 3:
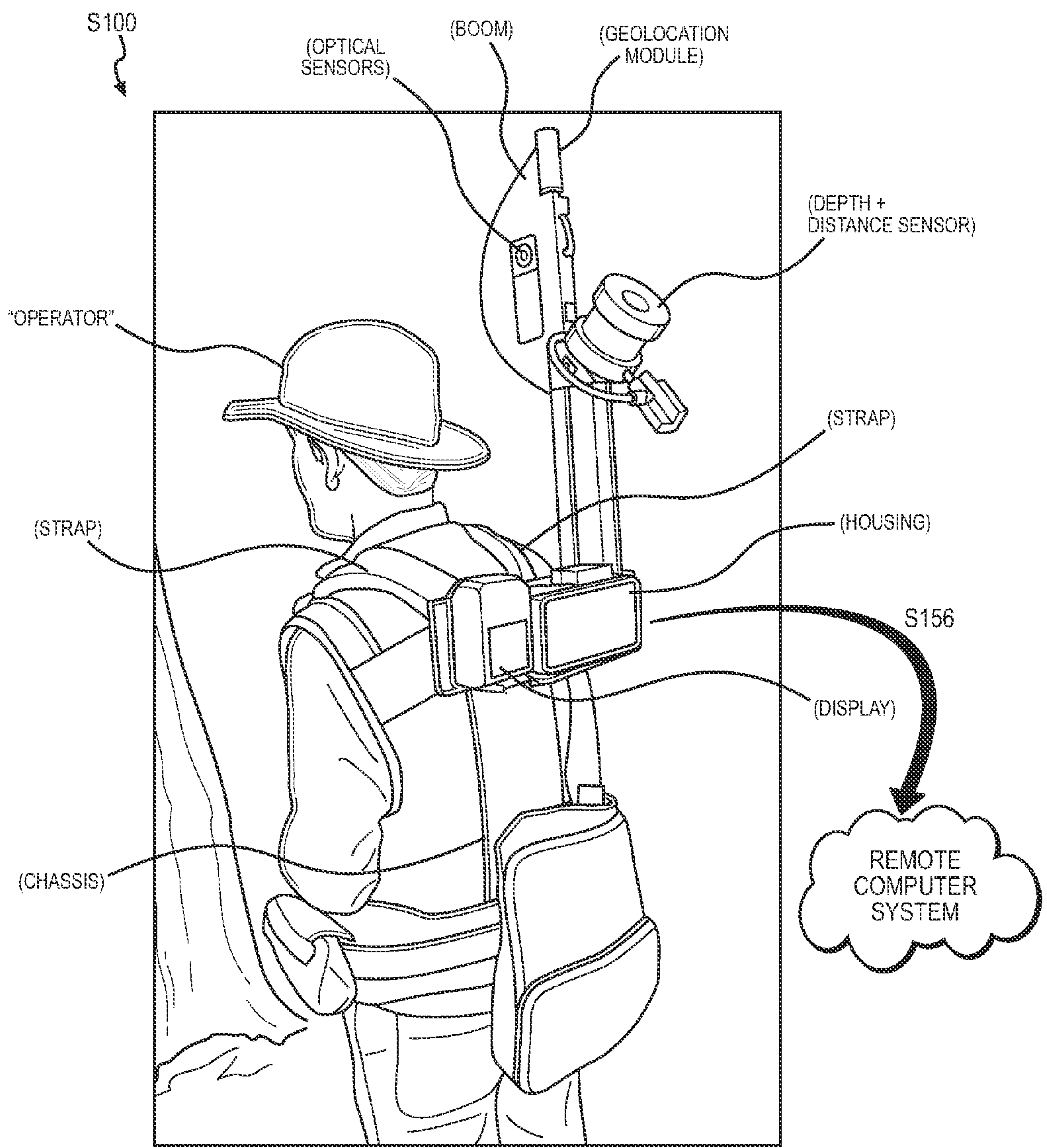
FIG. 3 is a flowchart representation of one variation of the method.

The mobile pack (e.g., a backpack, a bag, a knapsack) includes: a set of (e.g., two) straps configured to contact shoulders of an operator; a chassis; a boom (e.g., a mast) extending from the chassis and above a head of an operator carrying the mobile pack; a geolocation module (e.g., a global positioning system) coupled to the boom; a sensor suite including optical sensors (e.g., an RGB camera, a hyper-spectral camera, a LIDAR sensor, an omnidirectional camera), proximity sensors, and/or ambient condition sensors (e.g., temperature sensor, humidity/moisture sensor, light intensity sensor) coupled to the boom; an integral display (e.g., output device) removably coupled to the chassis; a housing coupled to the chassis; a wireless communications module (i.e., local controller) arranged in the housing; and a battery module arranged in the housing, as shown in FIG. 3.

In one implementation, the boom extends from the chassis and above a head of an operator carrying the mobile pack, defines a front face proximal a head of the user, and defines a rear face opposite the front face. In this variation, the set of optical sensors and the geolocation module (e.g., a global positioning system) are coupled to the front face of the boom and a depth sensor (e.g., a LIDAR depth sensor) is coupled to the rear face of the boom. The display is coupled to an upper edge of the chassis orthogonal to the boom and facing away from the set of straps. The housing is coupled to the upper edge of the chassis proximal the display and houses the local controller and the battery module. The housing is further configured to protect and reduce damage to the local controller and the battery module from external objects (e.g., tree limbs, leaves, rocks) within the forest and adverse weather conditions (e.g., heat, rain, snow, fog). The mobile pack further exhibits a weight within a target weight range and thereby enables an operator to traverse a target pathway through scan zones within the stand of trees according to the cruise plan, while carrying the mobile pack and additional personal items.

In one variation, the geolocation module, the local controller, the integral display, and the suite of sensors can be arranged within the housing of the mobile pack and the sensor suite and other sensors can be configured to install on the chassis of the mobile pack—such as by adhering or mechanically fastening to the chassis—with the field of view of each sensor facing outwardly from the chassis and intersecting a scan zone within the stand of trees.

In another variation, the mobile pack further includes: a chassis defining a longitudinal axis—parallel to a vertical axis of a user carrying the mobile pack—and configured to receive and retain optical sensors—in six degrees of freedom—while the operator traverses each scan zone; a suite of upward-facing optical sensors (e.g., RGB color and LIDAR depth sensors)—each optical sensor defining a field of view directed toward the tree-line of the stand of trees—mounted to a first side of the chassis along the longitudinal axis; and a suite of downward-facing optical sensors—each optical sensor defining a field of view directed toward the ground of the stand of trees—mounted to a second side of the chassis along the longitudinal axis.

In yet another variation, the housing of the mobile pack includes a suite of proximity sensors located along the first side and the second side of the longitudinal axis of the chassis and configured to detect proximity of objects—such as tree limbs or biowaste on a forest floor—to the mobile pack. For example, the mobile pack can include ultrasonic, electromagnetic, RADAR, and/or SONAR sensors fixedly mounted or dynamically mounted to the chassis.

In yet another variation, the housing of the mobile pack includes a display (e.g., output device) integrated into the mobile pack and electrically coupled to the battery of the mobile pack, such as via a wired connection running from the battery to the display, to enable an operator to remove the display from the chassis of the mobile pack and hold the display to review the cruise plan or a target pathway while the operator traverses each scan zone. The display is further configured to wirelessly connect to a computing device (e.g., a smart phone, a mobile device, a tablet) accessible by an operator while the operator traverses the array of scan zones. In this variation, the mobile pack also includes an accelerometer configured to calculate the velocity (i.e., speed) of the operator carrying the mobile pack during the cruise plan.

Therefore, the mobile pack enables an operator to traverse the array of scan zones within a stand of trees according to a cruise plan—while carrying the mobile pack—to collect data of the forest and offload these data, via the local controller, to a remote computer system to further extract metrics and insights of the forest. However, this "stand-alone," "mobile" pack can define any other form and is configured for an operator to carry the mobile pack in any other way.

3.1.1 Sensor Suite: Optical Sensors and Other Sensors

The suite of sensors can include: optical sensors (e.g., color cameras, omnidirectional cameras) configured to record and output two-dimensional color images; depth sensors (e.g., depth cameras) configured to record and output two-dimensional depth images or three-dimensional point clouds; a distance sensor (e.g., a one-dimensional infrared depth sensor, a two-dimensional LIDAR sensor) defining a field of view of a tree line within a stand of trees; an audio sensor (e.g., a transducer, a microphone); an ambient light sensor; a temperature sensor; an air quality or air pollution sensor; and/or a humidity sensor. However, the suite of sensors can include any other type of optical sensor, output visual, optical, or non-optical data in any other format, and include any other ambient sensor.

3.2 Local Controller

Generally, the local controller can access optical data (e.g., low-resolution images) and non-optical data collected by the suite of sensors within the mobile pack while the operator traverses each scan zone. The local controller can then manipulate these data: to extract geospatial locations of objects; to track distances of the mobile pack from other objects; to generate a two-dimensional map for each stand of trees in the cruise plan; to detect deviations; to generate notifications and prompts; and to present these two-dimensional maps, notifications, and prompts to the operator—such as in a text format presented at the display integrated into the mobile pack or presented at an interactive display at the operator's device (e.g., a smartphone, a tablet)—to enable the operator to selectively adjust their trajectory through a scan zone in near real-time.

More specifically, the local controller is configured to: record optical (e.g., RGB, depth, multispectral) images of trees and other objects (e.g., leaves, shrubbery, rocks, hills, drop-offs) within a stand of trees; locate a physical marker inserted into a ground surface of a scan zone within the stand of trees by an operator carrying the mobile pack); write a cotemporal location of the mobile pack and the physical marker to each optical image (e.g., via the geolocation module); track and maintain minimum distances from other objects (e.g., via the LIDAR sensor); record ambient conditions (e.g., via ambient sensors); generate a two-dimensional map of the stand of trees; and transmit optical and geospatial location data to the remote computer system to generate a three-dimensional representation of the stand of trees.

Additionally, the local controller can: generate notifications in response to detecting deviations; generate prompts for the operator—such as selectively triggering a prompt for an operator to traverse a scan zone within the stand of trees for a second attempt or selectively triggering a prompt for an operator to traverse the next scan zone within the stand of trees—in near real-time; and transmit these prompts to the display integrated into and connected to the mobile pack and accessible by the operator, to render these prompts on the display for review by the operator, as further described below.

For example, for each scan zone within the stand of trees of a segment (or "pathway") of the cruise plan, the local controller can: track the speed of the operator during this pathway of the cruise plan; derive an operator trajectory during this pathway of the cruise plan; annotate the operator trajectory with a duration between an initial timestamp of the physical marker and a last timestamp of the operator trajectory; and present this operator trajectory to the operator via the display integrated into the mobile pack.

3.3 User Portal

The system can further include a user portal for assisting users with cruise order requests, installation, rework, and operation of the system. The user portal can display various interfaces to a user of the system on a user's computing device (e.g., a smartphone, a tablet, a laptop computer) including: input interfaces for specifying a cruise order request for a stand of trees and parameters for generation of a plan for the stand of trees or otherwise configuring the system; and prompt interfaces that prompt the user to select particular metrics and/or insights for the stand of trees defined in the cruise order request.

4. REMOTE COMPUTER SYSTEM

The remote computer system—such as a remote server—can manipulate satellite images and generate a cruise plan defining a set of pathways through the array of scan zones for traversal by an operator. Additionally, the remote computer system can receive optical data (e.g., high-resolution images) and non-optical data (e.g., ambient data, proximity data, geospatial location data) from the local controller arranged within the mobile pack. The remote computer system can also execute simultaneous localization and mapping (or "SLAM") techniques to autonomously assemble a three-dimensional depth and/or color map of a stand of trees along the cruising path of an operator based on data collected by optical sensors and the depth sensor (e.g., two-dimensional LIDAR sensor) arranged within the mobile pack.

Furthermore, the remote computer system can manipulate these optical and non-optical data to generate a pathway—traversed by the operator—for each scan zone within the stand of trees, to derive a three-dimensional representation of the stand of trees, to extract metrics and insights of the forest, and/or to present these metrics and insights to a user (e.g., stand manager or owner affiliated with the forest) based on these data.

4.1 Data Aggregation: Three-Dimensional Representation of Forest

In one variation, the remote computer system can: access images from the suite of sensors collected during a cruise plan; and stitch these images together to generate an annotated composite image of a stand of trees for all cruise plans in the forest over a period of time (e.g., one month, one year, two years). Then, the remote computer system can store these annotated composite images in a database, execute SLAM techniques to assemble a two-dimensional depth map of the forest, and derive a three-dimensional representation of the forest based on a combination of the annotated composite images and the two-dimensional depth map, as further described below.

5. SETUP PERIOD

Generally, during a setup period (e.g., pre-cruising period), the remote computer system can receive a cruise order request from a user (e.g., stand manager or owner affiliated with the forest) via a user portal. The system and the remote computer system can cooperate to generate a cruise plan—defining an order of pathways for an operator to traverse through a stand of trees within the forest—for the cruise order request.

More specifically, the user can define particular metrics and insights to extract in the cruise order request. Then, the remote computer system can: receive the cruise order request via the user portal; and generate a cruise plan and a set of pathways for the operator to traverse for the corresponding cruise order. In this implementation, the remote computer system can: calculate an average quantity of steps an operator can traverse within a stand of trees for a particular time window (e.g., 6 hours, 8 hours, 10 hours); assign a quantity of operators (e.g., 2 operators) to complete the cruise order based on the quantity of steps each operator can traverse; derive a duration for each cruising pathway and a total duration for the cruise plan based on the quantity of operators; generate a two-dimensional map of the stand of trees; and transmit this two-dimensional map of the stand of trees to the system to present the two-dimensional map—during traversal of each scan zone and between traversal of each scan zone of the cruise plan—to the operator.

In one implementation, the remote computer system can: receive a cruise order request for a particular forest from a user (e.g., stand manager or owner affiliated with the forest) via a user portal; access a set of overhead images, such as satellite or aerial images, depicting the forest; extract features from each image in the set of overhead images representing terrain of the forest (e.g., trees, rocks, shrubbery, drop-offs, inclines, bridges, roads, leaves); detect a stand of trees within a first image of the set of overhead images; correlate the stand of trees from the first image with the cruise order request based on the features; and define a set of scan zones within the stand of trees for an operator carrying the mobile pack to traverse. Then, for each scan zone within the set of scan zones, the remote computer system can generate a set of concentric circles as a pathway—executed by the operator—for each scan zone based on the features from the first set of overhead images. The remote computer system can also: assign an identifier (e.g., numerical number, UUID) to each pathway; define a sequential order of each identifier to generate a cruise plan for the stand of trees; and transmit the cruise plan defining a pathway for each scan zone to the local controller arranged within the mobile pack.

Accordingly, the local controller can: receive the cruise plan defining the set of pathways from the remote computer system; access a first set of images captured by the sensor suite within the mobile pack prior to the cruise plan (e.g., pre-cruising); detect a first scan zone within the set of scan zones from a first image in the first set of images; match the first scan zone with the corresponding pathway from the cruise plan; and transmit this pathway to the display of the mobile pack and/or a computing device (e.g., a smartphone, a tablet) accessed by the operator and thereby, enable the operator to timely collect accurate data for the stand of trees in the forest.

For example, the remote computer system can: access an overhead image depicting the stand of trees; access a boundary of the stand of trees; project the boundary onto the overhead image; and overlay the array of scan zones onto the overhead image, Then, for each scan zone in the array of scan zones, the remote computer system can: define a minimum radius within a target radius range for the scan zone; define a first distance from a center of the scan zone for an outer scan path based on the minimum radius; and define a second distance from the center of the scan zone, less than the first distance, for an inner scan path. The remote computer system can aggregate minimum radii, outer scan paths, and inner scan paths into a set of elliptical pathways through the array of scan zones for execution by the user carrying the mobile pack; and transmit the set of elliptical pathways to the local controller of the mobile pack. The local controller can then receive the set of elliptical pathways for execution by the user carrying the mobile pack through the array of scan zones within the stand of trees and present a first pathway through a first scan zone in the stand of trees to the user on the display of the mobile pack.

In another implementation, during the setup period, the remote computer system can access data representing the forest and generate a set of waypoints defining navigation for the operator carrying the mobile pack through the forest. In this implementation, the remote computer system can: access a set of overhead images, such as aerial or satellite images from an aerial mapping service, depicting a particular stand of trees within the forest as defined in the cruise order request; scan these overhead images representing the stand of trees and the surrounding topographical features, to define a set of scan zones and detect obstacles near and within each scan zone, such as shrubs, rocks, drop-offs, and/or tree stumps; and define a target pathway intersecting the array of scan zones, such as nominally offset from trees by a predefined target offset distance (e.g., six feet), and that maintains a minimum distance (e.g., two feet) from detected obstacles. The remote computer system can then construct an ordered sequence of geospatially-referenced keypoints along the target pathway, such as offset by the target offset distance (e.g., six feet).

The remote computer system can repeat the methods and techniques described above for each other scan zone within the stand of trees to compile keypoints for the target pathway into a cruise plan; and transmit the cruise plan to the local controller to serve to the operator via the display integrated into the mobile pack and/or via the operator's device (e.g., a smartphone, a tablet).

In one variation, the local controller can autonomously generate a set of pathways and a sequence of keypoints for each pathway in (near) real-time based on data captured by the sensor suite, arranged within the mobile pack, while the operator traverses the stand of trees.

5.1 Grid Array of Scan Zones

In one variation, the remote computer system can: access an overhead image depicting the stand of trees; extract visual features from regions of the overhead image; characterize a difference between visual features of a first region and a second region of the overhead image; and project an array of scan zones onto the overhead image within the boundary of the stand of trees—based on the difference.

Further, the remote computer system can virtually overlay a two-dimensional grid array of 25-meter-diameter scan zones at 200-meter lateral and longitudinal pitch distances onto the overhead image. In this variation, the remote computer system can project a two-dimensional grid array of scan zones onto the overhead image, each scan zone: defining a minimum diameter within a target diameter range, such as between a 20-meter-diameter and a 30-meter-diameter or between a 23-meter-diameter and a 27-meter-diameter; defining a lateral pitch distance, such as 200 meters, greater than the minimum diameter and less than a maximum width of the boundary of the stand of trees; and defining a longitudinal pitch distance, such as 200 meters, greater than the minimum diameter and less than a maximum length of the boundary of the stand of trees.

For example, the remote computer system can: access an overhead image depicting the stand of trees; extract a first set of visual features from a first region—representing tree characteristics of a first set of trees—of the overhead image; extract a second set of visual features from a second region—representing tree characteristics of a second set of trees—of the overhead image; and characterize a difference between the first set of visual features and the second set of visual features. Then, in response to the difference between the first set of visual features and the second set of visual features exceeding a difference threshold (e.g., 70%), the remote computer system can: project a first scan zone (e.g., defining a 25-meter-diameter) onto the first region of the overhead image to encompass the first set of trees; and project a second scan zone (e.g., defining a 25-meter-diameter, a 200 meter lateral pitch distance, and a 200 meter longitudinal pitch distance from the first scan zone), onto the second region of the overhead image to encompass the second set of trees.

The remote computer system can repeat these methods and techniques for each other set of trees and for each other scan zone to virtually overlay the array of scan zones onto the overhead image. However, the remote computer system can overlay the array of scan zones onto the overhead image in any other way.

6. FIRST SCAN ZONE

Generally, the local controller can receive the set of elliptical pathways for execution by the user carrying the mobile pack through the array of scan zones within the stand of trees and present a first pathway through a first scan zone in the stand of trees to the user on the display of the mobile pack. The local controller can then detect a location of the operator proximal (e.g., within a threshold distance of, nearby) the first scan zone and trigger the set of optical sensors in the mobile pack to capture a sequence of images representing a first set of trees in the first scan zone.

More specifically, during the setup period, the remote computer system can implement methods and techniques described above to access an overhead image depicting the stand of trees; to access a boundary of the stand of trees; and to overlay the boundary and the array of scan zones onto the overhead image. The remote computer system can then define a set of geospatial boundaries based on the overhead image. During traversal of the first scan zone, the local controller can: access the set of geospatial boundaries; detect a first geolocation of the user carrying the mobile pack within a first geospatial boundary, in the set of geospatial boundaries, associated with the first scan zone; and automatically trigger the set of optical sensors in the mobile pack to capture a sequence of images representing a first set of trees in the first scan zone while the operator navigates along the first pathway through the first scan zone.

Alternatively, the operator may manually initiate a scan for the first scan zone through the display of the mobile device. The local controller can then trigger the set of optical sensors in the mobile pack to capture a sequence of images representing a first set of trees in the first scan zone while the operator, carrying the mobile pack, navigates the first elliptical pathway in the first scan zone. The local controller can then identify scan completion or scan incompletion (e.g., an incomplete scan, an incomplete scan attempt) of the first scan zone and serve feedback to the user in (near) real-time, as further described below.

7. REAL-TIME FEEDBACK

Generally, the operator can indicate completion of a pathway through a first scan zone via the display of the mobile pack. The local controller can then detect deviations from the cruise plan as a function of first scan zone coverage (or "coverage density"), offset distance, or image quality, and serve notifications, prompts, and/or an updated pathway to an operator through the display in (near) real-time according to these deviations.

More specifically, in response to the operator's trajectory matching the predefined pathway, the quantity of images depicting the first scan zone within the stand of trees exceeding the quantity threshold, and/or the coverage density exceeding the threshold coverage density, the local controller can: generate a notification to alert the operator of scan completion of the first scan zone and to cruise the next scan zone according to the cruise plan; and serve this notification to the operator by presenting the notification on the display of the mobile pack.

Alternatively, in response to the operator's trajectory deviating from the predefined pathway, the quantity of images depicting a first scan zone within the stand of trees falling below a threshold quantity, and/or the coverage density of the first scan zone falling below a threshold coverage density, the local controller can: define an updated pathway corresponding to a second attempt for traversal through the first scan zone; generate a notification to alert the operator of scan incompletion of the first scan zone and prompt the operator to traverse the first scan zone for a second attempt; and serve this notification and the updated pathway to the operator.

Additionally, in response to the coverage density of the first scan zone falling below the threshold coverage density and exceeding a second threshold coverage density less than the first threshold coverage density, the local controller can: generate a notification to alert the operator of scan completion and prompt the operator to increase a speed of traversal for a next scan zone in order to increase the coverage density of a next sequence of images above the first threshold coverage density for scan completion of the next scan zone.

7.1 Feedback: Scan Completion+Cruise Next Scan Zone

In one implementation, the local controller can implement regression techniques to characterize a coverage density of a first scan zone and, responsive to the coverage density of the first scan zone exceeding a threshold coverage density, alert the operator of scan completion of the first scan zone.

Further the local controller can: access the cruise plan defining a set of pathways for a user carrying the mobile pack to traverse through an array of first scan zones within a stand of trees; detect a location of the user proximal a first scan zone; and capture a sequence of images by a set of optical sensors arranged in the mobile pack while the user navigates along a first pathway. The local controller can then characterize a coverage density of the first scan zone based on visual features detected in the sequence of images by: detecting a quantity of the sequence of images; accessing the aerial or satellite image of the stand of trees; identifying the first scan zone in the aerial or satellite image; calculating an area of the first scan zone based on features detected in the aerial or satellite image; and characterizing the coverage density of the first scan zone based on a combination of the quantity of the sequence of images and the area of the first scan zone, such as dividing the quantity of the sequence of images by the area of the first scan zone. Then, in response to the coverage density of the first scan zone exceeding the threshold coverage density, the local controller can: generate a notification alerting the user of scan completion of the first scan zone and prompting the operator to traverse a pathway for the next scan; and serve the notification to the operator—via the display of the mobile pack—for review.

7.1.1 Trajectory of Operator+Scan Completion

In one variation, the local controller can track the location of the mobile pack and the operator within a first scan zone of the stand of trees relative to a physical marker (e.g., stake, pole, flag), inserted into a ground surface of the first scan zone by the operator at initiation of an elliptical pathway in the first scan zone, to derive a trajectory of the operator through the first scan zone. The local controller can further detect a difference between the trajectory of the operator and the elliptical pathway defined in the cruise plan for the first scan zone and, responsive to the difference falling below a threshold difference, alert the operator of scan completion of this first scan zone and serve the trajectory to the operator.

For example, the operator may: insert a physical marker, such as a stake, into a ground surface of the first scan zone at a center of the first scan zone according to the cruise plan; and traverse the first scan zone according to the pathway defined in the cruise plan. The local controller can then: access a sequence of images, captured by the set of optical sensors in the mobile pack, representing trees in the first scan zone; detect the stake occupying a target location such as a center of the first scan zone, based on features detected in a first image in the sequence of images; annotate the first image in the sequence of images with a first timestamp and the target location of the stake; annotate each other image in the sequence of images with timestamps; track cotemporal locations of the mobile pack and the stake based on timestamps from the sequence of images; rank these cotemporal locations in a sequential order to derive a trajectory of the user carrying the mobile pack for this first scan zone; extract a set of visual features from each image in the sequence of images; characterize a coverage density of the first scan zone based on the set of visual features; detect a difference between the trajectory of the user and the pathway for this first scan zone; and, in response to the difference falling below a threshold difference and in response to the coverage density exceeding the threshold coverage density, generate a notification to alert the operator of scan completion of the first scan zone and serve the notification and the trajectory of the operator to a display of the mobile pack.

Additionally or alternatively, the local controller can track the location of the mobile pack and the operator within a first scan zone of the stand of trees relative to a virtual marker, indicated by the operator on the display integrated into the mobile pack, to derive a trajectory of the user through the first scan zone. For example, the local controller can: receive a signal from a display integrated into the mobile pack; detect a virtual marker at a geospatial location proximal a center of the first scan zone based on the signal; annotate the first image in the first sequence of images with the first timestamp and the geospatial location of the virtual marker; track cotemporal locations of the mobile pack and the virtual marker based on timestamps from the sequence of images; and derive a trajectory of the user carrying the mobile pack for the first scan zone based on cotemporal locations of the mobile pack and the virtual marker.

In another variation, the local controller can implement the methods and techniques described above to calculate an offset distance between the trajectory of the operator and the cruising pathway. Then, in response to the offset distance falling below the distance threshold, the local controller can: generate a notification prompting the operator to traverse the next scan zone of the cruising pathway; and serve the notification to the operator—via the display—for review.

For example, the local controller can: capture a sequence of images—annotated with geospatial locations and timestamps of the mobile pack—by a set of optical sensors arranged within the mobile pack while the user navigates an elliptical pathway, in the set of elliptical pathways, within the first scan zone; derive a trajectory of the user carrying the mobile pack within the first scan zone based on these geospatial locations and timestamps; and detect an offset distance between the trajectory of the user and the outer scan path defined in the elliptical pathway in the set of pathways. Then, in response to the offset distance falling below an offset distance threshold and in response to the coverage density exceeding the threshold coverage density, the local controller can: generate a notification prompting the operator to traverse a next scan zone in the stand of trees; and serve the notification to the operator for review.

Therefore, the local controller can derive a trajectory of the operator through the first scan zone, detect a difference between the trajectory of the operator and the elliptical pathway defined in the cruise plan for the first scan zone and, responsive to the difference falling below a threshold difference, alert the operator of scan completion of this first scan zone and serve the trajectory to the operator in real-time.

7.1.2 Overlap Correspondence+Scan Completion

Figure 4:
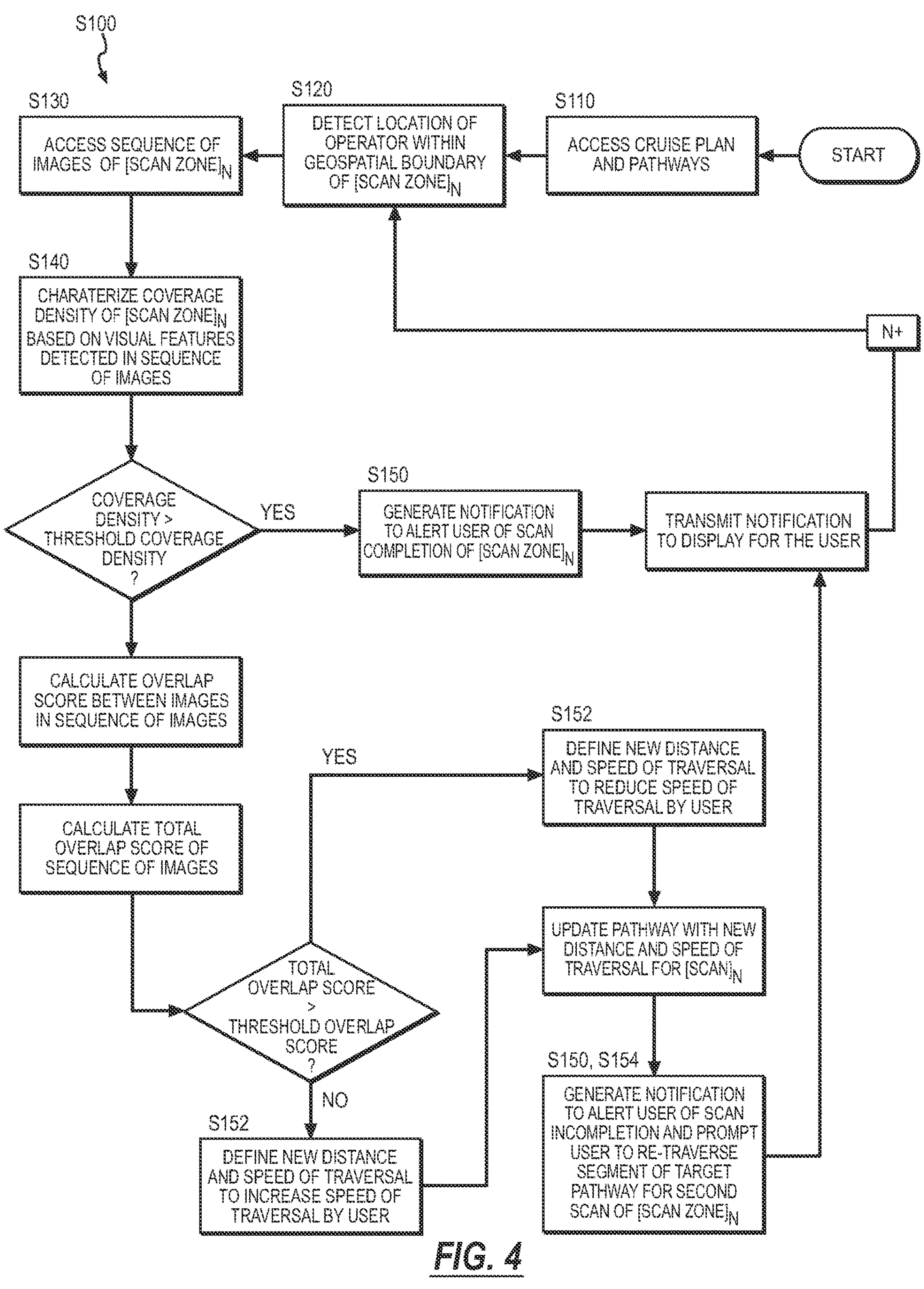
FIG. 4 is a flowchart representation of one variation of the method.

In one variation, the operator indicates completion of a segment of the cruise plan for a first scan zone within the stand of trees via the mobile device. In response to receiving the operator's indication, the local controller can: access a set of images—depicting the first scan zone—captured by the set of optical sensors arranged within the mobile pack; and implement artificial intelligence, machine learning, and/or other computer vision techniques to calculate an overlap score between each image in the set of images; and calculate a total overlap score based on a combination of these overlap scores. Then, in response to the total overlap score exceeding a threshold overlap score, the local controller can: generate a notification prompting the operator to traverse the next scan zone of the cruising pathway; and serve the notification to the operator—via the display of the mobile pack—for review, as shown in FIG. 4.

For example, the local controller can: access a sequence of images representing trees in a first scan zone; detect a first region, in a set of regions, in a first image in the sequence of images; identify a corresponding region, in a second set of regions, in a second image in the sequence of images that overlaps with the first region based on analogous features in the first image and the second image; calculate an overlap score, such as 30%, between the first image and the second image; repeat these methods and techniques for each other image in the sequence of images to calculate overlap scores between the first image and each other image in the sequence of images; and calculate a total overlap score, such as 88%, for the sequence of images based on a combination of overlap scores (e.g., an average of overlap scores between images). Then, in response to the total overlap score exceeding a threshold overlap score, the remote computer system can: generate a notification to alert the operator of completion of the first scan zone; and serve the notification to the operator.

Therefore, the local controller can access a sequence of images of the first scan zone, calculate a total overlap score of the sequence of images and, responsive to the total overlap score exceeding a threshold overlap score, alert the operator of scan completion of the first scan zone. Thus, once the operator navigates along the elliptical pathway through the first scan zone, the local controller can provide real-time feedback to the operator indicating scan completion and guide the operator to traverse through a subsequent scan zone.

7.2 Feedback: Scan Incompletion+Repeat Cruise of First Scan Zone

In one implementation, the local controller can implement regression techniques to characterize a coverage density of a first scan zone. Responsive to the coverage density of the first scan zone falling below a threshold coverage density, the local controller can: identify scan incompletion of the first scan zone; update the pathway for the first scan zone to guide the operator toward a target traversal speed; and prompt the operator to traverse the updated pathway for a second scan or a second attempt of the first scan zone.

In one variation, the operator indicates completion of a segment of the cruise plan for a first scan zone within the stand of trees via the display of the mobile pack. In response to receiving the operator's indication, the local controller can: access a first set of images captured by the set of optical sensors arranged within the mobile pack carried by the operator; and calculate an overlap score (e.g., alignment metric, an overlap correspondence) between each image in the first set of images. Then, in response to the overlap score falling below a threshold overlap score, the local controller can: calculate a target image quality based on the overlap score between each image in the first set of images; update the pathway for the first scan zone to enable the optical sensors to achieve the target image quality for a second sequence of images; generate a notification prompting the operator to repeat traversal of the first scan zone for a second attempt; and serve the notification and the updated pathway for the first scan zone to the operator through the display of the mobile pack.

In one example, the local controller: detects a geolocation of the operator within a geospatial boundary assigned to the first scan zone; accesses a first sequence of images—representing a first set of trees in the first scan zone—captured by the set of optical sensors in the mobile pack; calculates an overlap score between each image in the first sequence of images; and calculates a total overlap score for the first sequence of images based on the overlap score between each image in the first sequence of images. Responsive to the total overlap score falling below the threshold overlap score, the local controller: identifies scan incompletion of the first scan zone; represents the total overlap score as a traversal speed of the operator less than a target traversal speed defined in the cruise plan; automatically defines a third distance, less than the first distance and greater than the second distance, from the center of the first scan zone to increase the traversal speed of the user; updates the first pathway in the cruise plan with the new distance; prompts the operator to traverse the first pathway for a second scan of the first scan zone; and serves the prompt and the updated first pathway to the operator through the display of the mobile pack.

Alternatively, responsive to the total overlap score exceeding the threshold overlap score and responsive to the coverage density of the first scan zone falling below the threshold coverage density, the local controller: identifies scan incompletion of the first scan zone; represents the total overlap score as a traversal speed of the operator greater than a target traversal speed defined in the cruise plan; automatically defines a new distance—less than the first distance of the outer elliptical pathway and greater than the second distance of the inner elliptical pathway, from the center of the first scan zone to reduce the traversal speed of the user; updates the first pathway in the cruise plan with the new distance; prompts the operator to traverse the first pathway for a second scan of the first scan zone; and serves the prompt and the updated first pathway to the operator through the display of the mobile pack.

In another variation, the operator indicates completion of a segment of the cruise plan for a first scan zone within the stand of trees via the display. In response to receiving the operator's indication, the local controller can: access a set of images—depicting the first scan zone and annotated with locations and timestamps of the operator during the segment of the cruise plan—captured by the suite of sensors arranged within the mobile pack; compile the set of images into a two-dimensional map of the first scan zone for the segment of the cruise plan; and calculate a coverage of the first scan zone based on the two-dimensional map of the first scan zone. Then, in response to the coverage of the first scan zone falling below a coverage threshold, the local controller can: update the cruising pathway to enable the optical sensors to collect images greater than the quantity threshold; generate a notification prompting the operator to repeat traversal of the first scan zone for a second attempt; and serve the prompt to repeat the cruise of the first scan zone for a second attempt and the updated cruising pathway to the operator via the mobile device.

Therefore, the local controller can calculate a total overlap score of a first sequence of images of the first scan zone, interpret a traversal speed of the operator along the first pathway of the first scan zone according to the total overlap score, and automatically adjust the distance of the first pathway from the center of the first scan zone. Thus, the local controller can guide the operator toward a traversal speed to achieve scan completion of the first scan zone.

7.3 Feedback: Scan Completion+Prompt for Improvement of Next Scan Zone

In one implementation, the local controller can implement regression techniques to characterize a coverage density of the first scan zone and, responsive to the coverage density of the first scan zone falling within a target coverage density range, identify scan completion of the first scan zone and automatically prompt the operator to manually adjust a speed of traversal for a subsequent scan zone or update the pathway for the first scan zone to guide the operator toward a target traversal speed for the subsequent scan zone.

In one variation, the operator indicates completion of the first pathway for the first scan zone within the stand of trees via the display. In response to receiving the operator's indication, the local controller can: access a sequence of images—depicting the first scan zone and annotated with locations and timestamps of the operator during traversal of the first scan zone—captured by the set of optical sensors arranged in the mobile pack; derive a trajectory of the operator based on the locations and timestamps; and calculate an offset distance between the trajectory of the operator and the first pathway defined in the cruise plan. Then, in response to the offset distance exceeding a threshold offset distance, the local controller can: generate a notification prompting the operator to repeat traversal of the first scan zone for a second attempt; and serve the notification to repeat the first pathway of the first scan zone for a second attempt and the first pathway to the operator via the display.

For example, the local controller can: capture a sequence of images—annotated with geospatial locations and timestamps of the mobile pack—by a set of optical sensors arranged within the mobile pack while the user navigates an elliptical pathway, in the set of elliptical pathways, within the first scan zone; derive a trajectory of the user carrying the mobile pack within the first scan zone based on these geospatial locations and timestamps; and detect an offset distance between the trajectory of the user and the outer scan path defined in the elliptical pathway in the set of pathways. Then, in response to the offset distance exceeding an offset distance threshold and in response to the second coverage density falling below the threshold coverage density and exceeding the second threshold coverage density less than the first threshold coverage density, the local controller can: generate a notification prompting the user to increase the speed of traversal along the elliptical pathway for a subsequent scan zone; and transmit the notification to the display of the mobile pack.

Therefore, the local controller can derive a trajectory of the operator through the first scan zone, detect an offset distance between the trajectory of the operator and the elliptical pathway defined in the cruise plan for the first scan zone, and selectively prompt the operator to increase and/or decrease a speed of traversal for a subsequent scan zone and serve the trajectory and prompt to the operator in real-time.

7.3.1 Operator Guidance: Update Elliptical Pathway of First Scan Zone

In one implementation, the remote computer system can implement methods and techniques described above to transmit the cruise plan including the set of elliptical pathways to the local controller. Accordingly, the local controller can serve the cruise plan and the set of elliptical pathways to the operator via the display of the mobile pack. During execution of the cruise plan, the local controller can detect deviations, generate updated pathways, and serve these updated pathways to the operator in (near) real-time, as shown in FIG. 4.

In one variation, the local controller can: detect a location of the operator proximal the first scan zone; access a sequence of images representing a set of trees in the first scan zone captured by the set of optical sensors while the user navigates along the target pathway proximal (e.g., within a threshold distance, nearby) the location; characterize a coverage density of the first scan zone based on visual features detected in the sequence of images; and, in response to the coverage density falling below a threshold coverage density (e.g., a minimum coverage density), prompt the operator to re-traverse a segment of the target pathway for a second scan attempt of the first scan zone.

For example, the local controller can: access a sequence of images representing trees in the first scan zone; calculate an overlap score between each image in the sequence of images; and calculate total overlap score for the sequence of images based on the overlap score between each image in the sequence of images. Then, in response to the total overlap score falling below a threshold overlap score, the local controller can: define a new distance, less than a first distance for an outer scan path and greater than a second distance for an inner scan path, from a center of the first scan zone; define a target speed of traversal greater than the speed of traversal by the operator for the first scan attempt of the first scan zone; update a first elliptical pathway with the new distance and the new speed of traversal; generate a prompt for the user to re-traverse the first elliptical pathway for a second scan attempt of the first scan zone at the increased speed of traversal; and present the prompt to the operator within the display of the mobile pack.

Additionally or alternatively, in response to the overlap metric exceeding a threshold overlap metric, the local controller can: define a new distance, greater than the first distance for an outer scan path, from a center of the first scan zone; define a new speed of traversal less than the speed of traversal by the operator for the first scan attempt of the first scan zone; update a first elliptical pathway with the new distance and the new speed of traversal; and prompt the user to re-traverse the first elliptical pathway for a second scan attempt of the first scan zone at the reduced speed of traversal.

In another variation, during traversal the first scan zone, the local controller can: access a set of images captured by the set of optical sensors arranged within the mobile pack; detect a first scan zone in a first image in the set of images; extract features from the first image depicting the first scan zone; identify a difference between the features extracted from each image and a corresponding pathway defined in the cruise plan; detect a deviation from the pathway based on the difference; generate an updated pathway based on the deviation and the features; and serve the updated pathway to the operator. Alternatively, the local controller can offload the deviation and features to the remote computer system. The remote computer system can then update the pathway and transmit the updated pathway to the local controller to present the updated pathway to the operator.

The remote computer system and the local controller can then cooperate to repeat these methods and techniques for each other first scan zone and for each other stand of trees within the forest to complete the cruise plan corresponding to the cruise order request.

7.4 Real-Time Stitching: Two-Dimensional Map of Stand of Trees

In one implementation, the local controller can: collect high-resolution images captured by the sensor suite arranged within the mobile pack; downsample these high-resolution images into low-resolution images; and generate a two-dimensional map of the stand of trees depicted in the images in (near) real-time.

In one variation, the local controller can execute this process in (near) real-time to generate and develop a two-dimensional map of the stand of trees while the operator traverses along a pathway for each scan zone. For example, the local controller can: access a set of high-resolution images captured by optical sensors arranged within the mobile pack; downsample this set of high-resolution images into low-resolution images depicting each scan zone within the stand of trees; stitch these low-resolution images into a composite (e.g., panoramic) image of the stand of trees; generate a two-dimensional map of the stand of trees; and, in response to receiving an operator's indication that the pathway of the scan zone is complete via the display integrated into the mobile pack, serve this two-dimensional map of the stand of trees to the operator in (near) real-time, such as presented on the display for the operator to review.

In another variation, the local controller can generate an augmented two-dimensional map of each scan zone within the stand of trees and present this augmented two-dimensional map to the operator in near real-time. Further, the local controller can: record a sequence of images representing a set of trees in a first scan zone at the set of optical sensors; extract a set of terrain characteristics of the scan zone from the sequence of images; transform the sequence of images into a composite image of this first scan zone; and present the augmented two-dimensional representation of the first scan zone to the operator.

For example, the local controller can: record a first sequence of images—representing a set of trees in a first scan zone—captured by the set of optical sensors and characterized by a first resolution (e.g., high-resolution); extract a set of terrain characteristics of the scan zone based on visual features detected in each image in the sequence of images; downsample the first sequence of images into a second sequence of images characterized by a second resolution less than the first resolution (e.g., low-resolution); stich the second sequence of images into a composite image of this first scan zone; aggregate the composite image and the set of terrain characteristics into an augmented two-dimensional representation of this first scan zone; and render the augmented two-dimensional representation of the first scan zone on the display of the mobile pack.

Thus, the local controller can present a two-dimensional map of each scan zone to the operator at the termination of a pathway of the cruise plan in near real-time and thereby enable the operator to timely review the two-dimensional map of a next scan zone prior to traversal of a pathway through the next scan zone.

8. OTHER SCAN ZONES

The local controller can implement methods and techniques described above for each other scan zone defined in the cruise plan or for each other scan zone in the array of scan zones to detect the location of the operator and the mobile pack, capture images of each other scan zone, characterize a coverage density for each other scan zone and, based on the coverage density, identify scan completion or scan incompletion of each other scan zone and serve feedback to the operator in (near) real-time.

For example, the operator may manually initiate a scan for a second scan zone through the display of the mobile device. The local controller can then trigger the set of optical sensors in the mobile pack to capture a sequence of images representing a second set of trees in the second scan zone while the operator, carrying the mobile pack, navigates a second elliptical pathway in the second scan zone. The local controller can then identify scan completion or scan incompletion of the second scan zone and serve feedback to the operator in (near) real-time.

9. MAPPING

Generally, the local controller can generate a two-dimensional map of a stand of trees in (near) real-time while the operator navigates a pathway in a scan zone, as described above. Once the operator traverses each pathway in the cruise plan (e.g., post-cruise, post-scan), the local controller and remote computer system can cooperate to derive a total duration of the cruise plan, present the duration of each pathway and the total duration of the cruise plan to the operator, and generate a three-dimensional representation of the forest. The remote computer system can then extract insights and metrics from the three-dimensional representation to present to the user (e.g., owner or stand manager) associated with the cruise order request.

More specifically, the remote computer system can access optical data (e.g., color images and depth images) and non-optical data (e.g., ambient condition data) captured by the system while the operator navigates along the set of pathways through the stand of trees in real-time during traversal of each pathway and/or upon termination of each pathway. The remote computer system can then manipulate these optical and non-optical data: to derive two-dimensional and/or three-dimensional representations of each scan zone; to assemble these representations into a two-dimensional and/or three-dimensional representation of the stand of trees; to derive correlations between tree characteristics of each scan zone; to interpolate tree characteristics of the stand of trees; and to compile tree characteristics into a virtual representation of tree characteristics across the stand of trees, as shown in FIGS. 2A and 2B.

In one implementation, the remote computer system can compile images—captured by the set of optical sensors in the mobile pack while the operator navigates the set of pathways through the stand of trees—into a composite image of each scan zone and/or compile depth images captured by the suite of sensors and combine these depth images with the color images to assemble a color three-dimensional representation of each scan zone.

9.1 Post-Hoc Stitching: Two-Dimensional Representation+ Tree Characteristics

Furthermore, the local controller executes the foregoing methods and techniques to: collect optical data (e.g., high-resolution color images) and non-optical data (e.g., ambient and geospatial location data) of a set of scan zones within the stand of trees; and offload (e.g., streams) these data to the remote computer system, such as during or following completion of this cruise plan. The remote computer system then executes the foregoing methods and techniques to generate a two-dimensional or three-dimensional representation of the forest.

In particular, the remote computer system can receive high resolution color images depicting each scan zone within a stand of trees—during a cruise plan—from the system and stitch these color images into a composite (e.g., panoramic) color image of the stand of trees. The system can then implement these methods and techniques for each other stand of trees within the forest to stitch these other color images into a composite color image of the forest. Additionally, the system can annotate the composite color image of the forest with ambient and geospatial location data to generate a two-dimensional map of the forest; and present this two-dimensional forest map to a user (e.g., stand manager or owner affiliated with the forest).

In one variation, the remote computer system can interpolate a set of total tree characteristics of the stand of trees based on tree canopy characteristics associated with each scan zone and compile the total set of tree characteristics into a virtual representation of tree characteristics across the stand of trees.

For example, the remote computer system can: access a first sequence of images representing a first set of trees in a first scan zone; access a second sequence of images representing a second set of trees in the second scan zone; extract a first set of tree canopy characteristics of the first set of trees from the first sequence of images; extract a second set of tree canopy characteristics of the second set of trees from the second sequence of images; and interpolate a third set of tree canopy characteristics of a fourth set of trees between the first scan zone and the second scan zone based on visual features detected in the first sequence of images and the second sequence of images. The remote computer system can then: access an overhead image of the stand of trees; detect a set of overhead tree characteristics of the stand of trees based on visual features detected in the overhead image; interpolate a set of total tree characteristics of the stand of trees based on the set of overhead tree characteristics, the first set of tree canopy characteristics, the second set of tree canopy characteristics, and the third set of tree canopy characteristics; and compile the set of total tree characteristics into a virtual representation of tree characteristics across the stand of trees.

9.2 Three-Dimensional Representation

In one implementation, once the operator carrying the mobile pack traverses to set of pathways and complete the cruise plan, the remote computer system can generate a three-dimensional representation of the stand of trees within the forest. In this implementation, the remote computer system can: collect optical data and depth data from the sensor suite arranged in the mobile pack; execute SLAM techniques to generate a two-dimensional map of the stand of trees based on the depth data; and develop a three-dimensional representation of the forest based on a combination of the two-dimensional map of each stand of trees and the optical data. The remote computer system can then: extract metrics and insights from this three-dimensional representation; and present this three-dimensional representation to the user (e.g., owner or stand manager) associated with the cruise order, thereby enabling the user to review insights and metrics for the cruise order, as further described below.

In one variation, the remote computer system can access raw two-dimensional images and depth images of the canopy of the first set of trees within the first scan zone captured by the suite of sensors arranged in the mobile pack and stitch these raw two-dimensional images together into a composite two-dimensional image of the canopy for the first scan zone. The remote computer system can similarly stitch raw two-dimensional images of the underside of the canopy captured by the system into a composite two-dimensional image of the canopy from the underside perspective and layer depth images onto the composite two-dimensional image to construct a spatial representation of the canopy from an under-canopy perspective. The remote computer system can then: combine the spatial representation from the under-canopy perspective and depth images to construct a color three-dimensional representation of each scan zone in the stand of trees. Further, the remote computer system can layer ambient condition data (i.e., temperature, humidity, light level) onto the three-dimensional representation of each scan zone.

Additionally, the remote computer system can augment the three-dimensional representation of the first scan zone by annotating the representation with depth images and ambient data (e.g., temperature, humidity, light level) collected by the suite of sensors arranged in the mobile pack. For example, the remote computer system can: access a first sequence of depth images representing the underside of the canopy of a first set of trees in the first scan zone; access a second sequence of depth images representing bases of the first set of trees; and access a third sequence of depth images representing trunks of the first set of trees from the suite of sensors arranged in the mobile pack. The remote computer system can then compile the first sequence of images, the second sequence of images, the first sequence of depth images, the second sequence of depth images, and the third sequence of depth images into a color three-dimensional representation of the first set of trees in the first scan zone. Alternatively, the remote computer system can access a sequence of depth images representing bases, trunks, and the underside canopy of the first set of trees in the first scan zone. The remote computer system can then: compile the first sequence of images, the second sequence of images, and the first sequence of depth images into a color three-dimensional representation of the first set of trees in the first scan zone.

Further, the remote computer system can assemble ambient data into a similar first ambient condition representation for the first scan zone or store ambient data in an ambient data layer in the representation of the first scan zone. The representation of the first scan zone can also define an assembly of a cylinder containing the first scan zone. The remote computer system can then populate the cylinder with optical data (e.g., depth, and RGB data) collected by the set of optical sensors arranged in the mobile pack and store this populated cylinder as a first representation defining a georeferenced three-dimensional point cloud representing trees and tree features of the first set of trees in the first scan zone.

Therefore, the remote computer system can aggregate images captured by the set of optical sensors arranged in the mobile pack to generate a three-dimensional representation of the first scan zone and annotate the three-dimensional representation with depth images and ambient condition data. Additionally, the remote computer system can access an overhead image depicting tops of trees in first scan zone (e.g., a satellite image, an aerial image) and augment the spatial representation with this overhead image to derive correlations between the overhead image, the sequences of images, and ambient condition data captured by sensors arranged in the mobile pack.

9.2.1 Audio Data+Virtual Experience

Figure 2C:
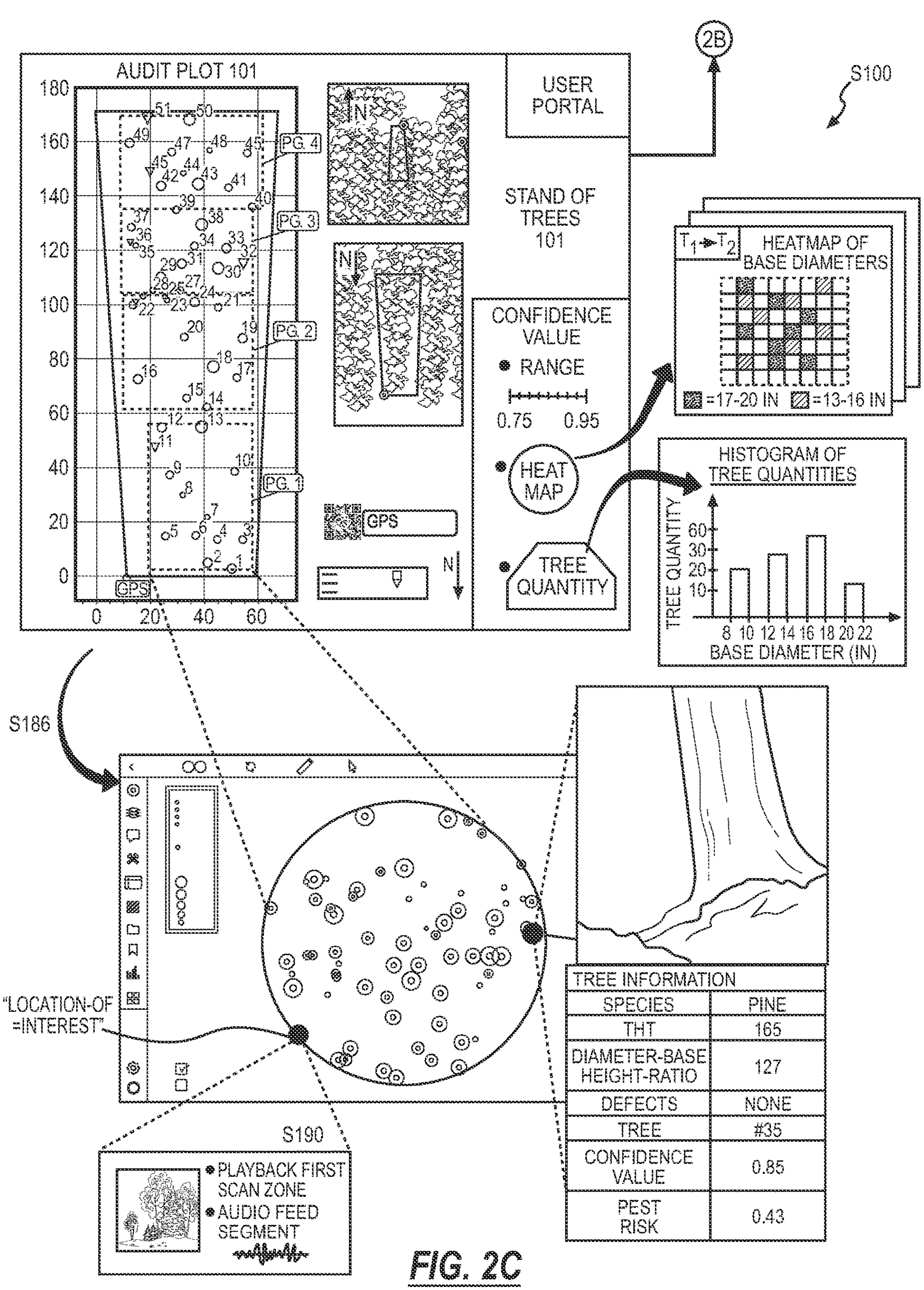

In one implementation, the remote computer system can implement the methods and techniques described above to extract tree canopy characteristics of a first scan zone and a second scan zone and generate a three-dimensional representation of the stand of trees. Further, the remote computer system can access audio data captured by the system, such as by an integrated microphone of an omni-directional camera arranged in the mobile pack, during traversal of the target pathway through the first scan zone and the second scan zone and identify locations-of-interest to highlight in the three-dimensional representation of the stand of trees based on these audio data. The remote computer system can then present the three-dimensional representation of the stand of trees to a user (e.g., an owner, a stand manager) associated with the cruise order request, as shown in FIG. 2C.

For example, the remote computer system can implement the methods and techniques described above to extract tree canopy characteristics of a first scan zone and a second scan zone. Then the remote computer system can: aggregate the first sequence of images and the first set of tree canopy characteristics into a first three-dimensional representation of the first scan zone; aggregate the second sequence of images and the second set of tree canopy characteristics into a second three-dimensional representation of the second set of the second scan zone; and assemble the set of total tree characteristics, the first three-dimensional representation of the first scan zone, and the second three-dimensional representation of the second scan zone into a third three-dimensional representation of the stand of trees.

The remote computer system can then: receive an audio feed associated with the first scan zone from the local controller; extract a set of human speech characteristics from a first segment of the audio feed in Block S182; detect a location-of-interest in the first scan zone from the first segment of the audio feed based on the set of speech characteristics in Block S184; in response to detecting the location-of-interest in the first scan zone from the first segment of the audio feed, highlight a corresponding location in the first scan zone within the third three-dimensional representation of the stand of trees as the location-of-interest; annotate the location-of-interest within the third three-dimensional representation of the stand of trees with the first segment of the audio feed in Block S186; and present a virtual experience of the pathway including human speech characteristics detected along the pathway through the first scan zone to the user via the user portal in Block S190.

Additionally or alternatively, the remote computer system can: extract non-speech characteristics (e.g., a birdsong, water rushing, tree branches in the wind) from the audio feed. For example, the remote computer system can: aggregate the first sequence of images and the first set of tree canopy characteristics into a three-dimensional representation of the first scan zone; retrieve an audio feed associated with the first scan zone from the local controller; extract a set of non-speech characteristics, such as chirping from a bird, from a segment of the audio feed in Block S182; and detect a location-of-interest in the first scan zone from the segment of the audio feed based on the set of non-speech characteristics in Block S184. Then, in response to detecting the location-of-interest in the first scan zone from the segment of the audio feed, the remote computer system can: highlight a corresponding location in the first scan zone within the three-dimensional representation of the first scan zone as the location-of-interest; annotate the location-of-interest within the three-dimensional representation of the first scan zone with the segment of the audio feed in Block S186; and present a virtual video experience of the pathway including non-speech characteristics detected along the elliptical pathway through the first scan zone to the user via the user portal in Block S190.

Therefore, the remote computer system can cooperate with the local controller to access an audio feed via a microphone arranged in the mobile pack and extract human speech characteristics and non-human speech characteristics from the audio feed in order to detect locations-of-interest in each scan zone. Additionally, the remote computer system can annotate the three-dimensional representation of each scan zone to present virtual video experiences of each scan zone to the user associated with the cruise order request.

10. METRICS

Generally, the remote computer system can extract a set of metrics from the three-dimensional representation of the stand of trees including: tree count, species, timber volume, and health metrics of the stand of trees. In particular, the remote computer system can extract a gross tree count from the three-dimensional representation of the stand of trees and segment the count into metric categories such as healthy mature trees, healthy immature trees, unhealthy trees, harvest-ready trees, etc.

Furthermore, the remote computer system can segment the tree count by tree species using secondary data in the synthetic three-dimensional representation of the stand of trees to produce a species histogram and thereby, enable a stand manager or owner to visualize the timber content of the stand of trees. The remote computer system can also calculate additional metrics from the images and non-optical data collected by the suite of sensors arranged in the mobile pack and the three-dimensional representation including board feet of a particular species of timber, or carbon capture and/or sequestration values of the stand of trees, based on the count, age, and size of trees present in the stand.

In one implementation, the remote computer system can identify a particular tree species within a first scan zone within the three-dimensional representation of the stand of trees by extracting a set of characteristics of the particular tree within the first scan zone from the three-dimensional representation of the stand of trees. The remote computer system then accesses a set of template characteristics associated with a tree type and implements computer vision techniques, such as template matching techniques, to match the detected features of the particular tree to the set of template characteristics associated with the tree type. In response to the detected characteristics of the particular tree corresponding to (e.g., analogous to or matching) the set of template characteristics, the remote computer system assigns the tree type, associated with the set of template characteristics, to the particular tree. The remote computer system can repeat these methods and techniques to assign tree types to each other particular tree in the stand of trees. The remote computer system can then interpolate tree types for other trees within the three-dimensional representation of the stand of trees not directly detected by set of optical sensors arranged in the mobile pack to further complete the three-dimensional representation of the stand of trees.

In another implementation, the remote computer system can construct an audit tool: defining or linked to a database and a user interface; configured to interpret data contained in the three-dimensional representation of the stand of trees and configured to render this representation—annotated with metrics—within a user portal. The remote computer system can aggregate data collected from a scan zone of a stand of trees and/or scan data collected from the array of scan zones in the stand of trees to augment or enhance the three-dimensional representation of the stand of trees.

10.1 Composite Value+Metric Function

Generally, the remote computer system can implement computer vision techniques (e.g., object detection, edge detection, template matching) to detect visual features (e.g., bark characteristics, pixel width, foliage characteristics) of each tree depicted in a high-resolution ground image and characterize a value of a metric associated with these visual features such as: tree type; tree species; pest risk; base diameter; fire risk; defects; carbon capture; etc. The remote computer system can then generate a metric function representing a correlation between values of this metric and these visual features.

In one implementation, the remote computer system can: access a set of ground images representing bases of the stand of trees and captured by the set of optical sensors arranged in the mobile pack; and isolate a first set of trees depicted in the set of ground images. Then, for each tree in the first set of trees, the remote computer system can: detect a first region of the set of ground images depicting the tree; extract a set of visual features from the first region of the set of ground images; characterize a value of a metric of the tree based on the set of visual features; detect a second region of the overhead image depicting the tree; and store the value of the metric and the set of visual features in a container in a set of containers. The remote computer system can then: generate a metric function representing a correlation between values of the metric and visual features within the stand of trees based on the set of containers.

Therefore, the remote computer system can extract raw metrics corresponding to the stand of trees collected by the system, extrapolate additional metrics describing characteristics of the stand of trees, and assign these additional metrics to individual trees. The remote computer system can then interpolate characteristics of other unscanned trees between scan zones to predict additional characteristics of other trees within the three-dimensional representation of the stand of trees. Additionally, the remote computer system can assemble the raw and derived metrics into a comprehensive data set representing the stand of trees and annotate the three-dimensional representation of the stand of trees with the comprehensive data set to enable the owner or stand manager to execute management decisions regarding the stand of trees such as harvest times, pest mitigation strategies, fire risk mitigation, etc.

10.1.1 Ground Images+Confidence Scores

In one variation, the remote computer system can: assign confidence scores to each tree depicted in the high-resolution set of images proportional to the resolution of the image depicting each tree; and further represent these confidence scores in the virtual representation.

For example, for each tree in the first set of trees, depicted in a first image, in the sequence of images, captured by the set of optical sensors in the mobile pack, the remote computer system can: calculate a confidence score (e.g., 90%) of the value of metric of the tree proportional to a resolution, such as a high-resolution, of the first region of a first image, in the sequence of images, depicting the tree; and store the confidence score, the value of the metric, and the set of visual features in the container, in the set of containers. The remote computer system can then: generate a visual representation of confidence scores for the first set of trees based on the set of containers; populate the virtual representation of confidence scores with confidence scores of the first set of trees; and annotate the composite value of the metric for the stand of trees with this updated virtual representation of confidence scores.

10.2 Metric Variation: Bark Characteristics

In one variation, the remote computer system can identify a particular tree within a first scan zone within the three-dimensional representation of the stand of trees and extract the set of ground images captured by the set of optical sensors arranged in the mobile pack from the three-dimensional representation of the stand of trees. The remote computer system can then detect a set of visual features representing bark characteristics of a particular tree within the first scan zone. The remote computer system can leverage the tree type of the tree to access a set of nominal (e.g., baseline) bark characteristics for the particular tree. The remote computer system can then identify a difference between the visual features and the nominal set of bark characteristics to characterize a pest risk value of the particular tree.

For example, the remote computer system can: identify an image, in the set of ground images, depicting a particular tree; extract a particular set of bark characteristics of the particular tree from the image; access a set of nominal bark characteristics of the particular tree; characterize a difference between the particular set of bark characteristics and the set of nominal bark characteristics of the particular tree; characterize a pest presence value of the particular tree based on the difference between the particular set of bark characteristics and the set of nominal bark characteristics of the particular tree; and store the pest presence value as a particular value of the metric in a container associated with the particular tree. Then, based on the container, the remote computer system can: calculate a particular confidence score of the pest presence value of the particular tree proportional to the resolution of the image, such as a high-resolution image, depicting the particular tree; and, in response to the particular confidence score exceeding a threshold confidence score, generate a virtual representation of pest presence value for the particular tree. The remote computer system can then: compile the virtual representation of the pest presence value for the particular tree, and the image, in the sequence of images, into a report for the stand of trees; and render the report for the stand of trees for presentation within a user portal.

The remote computer system can repeat the foregoing methods and techniques for other trees in the scan zone or trees in other scan zones, to predict pest risk values of these other trees. The remote computer system can further aggregate the pest risk values of individual trees within a scan zone to generate a pest risk value of the scan zone, and/or aggregate pest risk values across the three-dimensional representation of the stand of trees to predict areas of pest risk. The remote computer system can also identify other extrapolated metrics from the three-dimensional representation of the stand of trees such as fire risk, disease or blight, timber quality (e.g., rotten trees, damaged trees), carbon capture, etc.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

The invention claimed is:

1. A method comprising:

at a mobile pack, accessing a target pathway for a user, the target pathway intersecting an array of scan zones within a stand of trees;

during a first time period:

detecting a first location of the user proximal a first scan zone;

by a set of optical sensors arranged in the mobile pack, capturing a first sequence of images, representing a first set of trees in the first scan zone, while the user navigates along the target pathway proximal the first location;

characterizing a first coverage density of the first scan zone based on visual features detected in the first sequence of images; and in response to the first coverage density exceeding a threshold coverage density, alerting the user of scan completion of the first scan zone;

during a second time period:

detecting a second location of the user proximal a second scan zone;

by the set of optical sensors, capturing a second sequence of images representing a second set of trees in the second scan zone, while the user navigates along the target pathway proximal the second location;

characterizing a second coverage density of the second scan zone based on visual features detected in the second sequence of images; and in response to the second coverage density falling below the threshold coverage density and exceeding a second threshold coverage density less than the first threshold coverage density, prompting the user to increase a speed of traversal along the target pathway for a subsequent scan zone; and during a third time period:

detecting a third location of the user proximal the third scan zone;

by the set of optical sensors, capturing a third sequence of images representing a third set of trees in the third scan zone, while the user navigates along the target pathway proximal the third location;

characterizing a third coverage density of the third scan zone based on visual features detected in the third sequence of images; and in response to the third coverage density falling below the second threshold coverage density, prompting the user to re-traverse a segment of the target pathway for a second scan of the third scan zone.

2. The method of claim 1, further comprising, at a computer system during a fourth time period:

accessing the first sequence of images and the second sequence of images from the mobile pack;

extracting a first set of tree canopy characteristics of the first set of trees from the first sequence of images;

extracting a second set of tree canopy characteristics of the second set of trees from the second sequence of images;

interpolating a third set of tree canopy characteristics of a fourth set of trees between the first scan zone and the second scan zone based on visual features detected in the first sequence of images and the second sequence of images;

accessing an overhead image of the stand of trees;

detecting a set of overhead tree characteristics of the stand of trees based on visual features detected in the overhead image;

interpolating a set of total tree characteristics of the stand of trees based on the set of overhead tree characteristics, the first set of tree canopy characteristics, the second set of tree canopy characteristics, and the third set of tree canopy characteristics; and compiling the set of total tree characteristics into a virtual representation of tree characteristics across the stand of trees.

3. The method of claim 2:

further comprising:

aggregating the first sequence of images and the first set of tree canopy characteristics, into a first three-dimensional representation of the first scan zone; and aggregating the second sequence of images and the second set of tree canopy characteristics into a second three-dimensional representation of the second set of the second scan zone;

wherein compiling the set of total tree characteristics into the virtual representation of tree characteristics across the stand of trees comprises assembling the set of total tree characteristics, the first three-dimensional representation of the first scan zone, and the second three-dimensional representation of the second scan zone into a third three-dimensional representation of the stand of trees; and further comprising:

retrieving an audio feed associated with the first scan zone;

extracting a set of speech characteristics from a first segment of the audio feed;

detecting a location-of-interest in the first scan zone from the first segment of the audio feed based on the set of speech characteristics; and in response to detecting the location-of-interest in the first scan zone from the first segment of the audio feed:

highlighting a corresponding location in the first scan zone within the third three-dimensional representation of the stand of trees as the location-of-interest; and annotating the location-of-interest within the third three-dimensional representation of the stand of trees with the first segment of the audio feed.

4. The method of claim 1:

further comprising, during the first time period:

detecting a marker occupying a target location in the first scan zone based on features detected in a first image in the first sequence of images;

annotating the first image in the first sequence of images with a first timestamp and the target location of the marker;

annotating each image in the first sequence of images with timestamps;

tracking cotemporal locations of the mobile pack and the marker based on timestamps from the first sequence of images;

deriving a trajectory of the user carrying the mobile pack for the first scan zone based on cotemporal locations of the mobile pack and the marker; and detecting a difference between the trajectory of the user and the pathway for the first scan zone; and wherein generating the first notification to alert the user of scan completion of the first scan zone comprises, in response to the difference falling below a threshold difference and in response to the first coverage density exceeding the threshold coverage density:

generating a first notification to alert the user of scan completion of the first scan zone; and serving the first notification and the trajectory of the user to a display of the mobile pack.

5. The method of claim 4:

wherein detecting the marker occupying the target location in the first scan zone comprises:

receiving a signal from a display integrated into the mobile pack; and detecting a virtual marker at a geospatial location proximal a center of the first scan zone based on the signal;

wherein annotating the first image in the first sequence of images with the first timestamp and the target location of the marker comprises annotating the first image in the first sequence of images with the first timestamp and the geospatial location of the virtual marker;

wherein tracking cotemporal locations of the mobile pack and the marker comprises tracking cotemporal locations of the mobile pack and the virtual marker based on timestamps from the first sequence of images; and wherein deriving the trajectory of the user carrying the mobile pack for the first scan zone comprises deriving the trajectory of the user carrying the mobile pack for the first scan zone based on cotemporal locations of the mobile pack and the virtual marker.

6. The method of claim 1:

further comprising, during a setup period preceding the first time period:

accessing an overhead image depicting the stand of trees;

accessing a boundary of the stand of trees;

projecting the boundary onto the overhead image;

overlaying the array of scan zones onto the overhead image;

for each scan zone in the array of scan zones:

defining a minimum radius within a target radius range for the scan zone;

defining a first distance from a center of the scan zone for an outer scan path based on the minimum radius; and defining a second distance from the center of the scan zone, less than the first distance, for an inner scan path;

aggregating minimum radii, outer scan paths, and inner scan paths into a set of elliptical pathways through the array of scan zones for execution by the user carrying the mobile pack; and transmitting the set of elliptical pathways to a local controller of the mobile pack; and wherein at the mobile pack, accessing the target pathway for the user comprises at the mobile pack, receiving the set of elliptical pathways for execution by the user carrying the mobile pack through the array of scan zones within the stand of trees.

7. The method of claim 6:

wherein, by the set of optical sensors, capturing the first sequence of images comprises, by the set of optical sensors, capturing the first sequence of images while the user carrying the mobile pack navigates along a first elliptical pathway, in the set of elliptical pathways, in the first scan zone;

wherein, by the set of optical sensors, capturing the second sequence of images representing the second set of trees comprises, by the set of optical sensors, capturing the second sequence of images while the user carrying the mobile pack navigates along a second elliptical pathway, in the set of elliptical pathways, in the second scan zone; and wherein, by the set of optical sensors, capturing the third sequence of images representing the third set of trees comprises, by the set of optical sensors, capturing the third sequence of images while the user carrying the mobile pack navigates along a third elliptical pathway, in the set of elliptical pathways, in the third scan zone.

8. The method of claim 6:

wherein characterizing the third coverage density of the third scan zone comprises:

calculating an overlap score between each image in the third sequence of images; and calculating a total overlap score for the third sequence of images based on the overlap score between each image in the third sequence of images; and wherein prompting the user to re-traverse the segment of the target pathway for the second scan of the third scan zone comprises, in response to the total overlap score falling below a threshold overlap score:

defining a third distance, less than the first distance and greater than the second distance, from a first center of the second scan zone;

defining a second speed of traversal greater than the speed of traversal; and updating a first elliptical pathway, in the set of elliptical pathways, with the third distance and the second speed of traversal; and prompting the user to re-traverse the first elliptical pathway, in the set of elliptical pathways, for the second scan of the third scan zone.

9. The method of claim 6:

wherein characterizing the third coverage density of the third scan zone comprises:

detecting an overlap between each image in the third sequence of images; and calculating an overlap metric for the third sequence of images based on the overlap between each image in the third sequence of images; and wherein prompting the user to re-traverse the segment of the target pathway for the second scan of the third scan zone comprises, in response to the overlap metric exceeding a threshold overlap metric:

defining a third distance, greater than the first distance, from a first center of the third scan zone;

defining a second speed of traversal less than the speed of traversal;

updating a first elliptical pathway, in the set of elliptical pathways, with the third distance and the second speed of traversal; and prompting the user to re-traverse the first elliptical pathway, in the set of elliptical pathways, for the second scan of the third scan zone.

10. The method of claim 6:

wherein, by the set of optical sensors, capturing the second sequence of images representing the second set of trees comprises, by the set of optical sensors, capturing the second sequence of images annotated with geospatial locations and timestamps of the mobile pack while the user navigates along an elliptical pathway, in the set of elliptical pathways, within the second scan zone; and further comprising, during the second time period:

deriving a trajectory of the user carrying the mobile pack within the second scan zone based on the second sequence of images;

detecting an offset distance between the trajectory of the user and the outer scan path defined in the elliptical pathway in the set of pathways; and in response to the offset distance exceeding an offset distance threshold and in response to the second coverage density falling below the threshold coverage density and exceeding the second threshold coverage density less than the first threshold coverage density:

generating the notification prompting the user to increase the speed of traversal along a second elliptical pathway, in the set of elliptical pathways, for the subsequent scan zone; and transmitting the notification to the display of the mobile pack.

11. The method of claim 1:

further comprising, during a setup period preceding the first time period:

accessing an overhead image depicting the stand of trees;

accessing a boundary of the stand of trees;

overlaying the boundary and the array of scan zones onto the overhead image;

and defining a set of geospatial boundaries based on the overhead image;

wherein detecting the first location of the user proximal the first scan zone comprises detecting a first geolocation of the user carrying the mobile pack within a first geospatial boundary, in the set of geospatial boundaries, associated with the first scan zone;

wherein detecting the second location of the user proximal the second scan zone comprises detecting a second geolocation of the user carrying the mobile pack within a second geospatial boundary, in the set of geospatial boundaries, associated with the second scan zone; and wherein detecting the third location of the user proximal the third scan zone comprises detecting a third geolocation of the user carrying the mobile pack within a third geospatial boundary, in the set of geospatial boundaries, associated with the third scan zone.

12. The method of claim 1:

further comprising, during the third time period:

extracting a set of terrain characteristics of the second scan zone based on visual features detected in each image in the second sequence of images;

transforming the third sequence of images into a composite image of the third scan zone; and aggregating the composite image and the set of terrain characteristics into an augmented two-dimensional representation of the third scan zone; and wherein prompting the user to re-traverse the segment of the target pathway for the second scan of the third scan zone comprises, in response to the third coverage density falling below the second threshold coverage density:

generating a prompt for the user to re-traverse the segment of the target pathway for the second scan of the third scan zone; and rendering the augmented two-dimensional representation of the second scan zone and the prompt on a display of the mobile pack.

13. The method of claim 12:

wherein, by the set of optical sensors, capturing the third sequence of images comprises, by the set of optical sensors, capturing the third sequence of images representing the third set of trees in the third scan zone and characterized by a first resolution; and wherein transforming the third sequence of images into the composite image of the third scan zone comprises:

downsampling the third sequence of images into a fourth sequence of images characterized by a second resolution less than the first resolution;

stitching the fourth sequence of images into the composite image of the third scan zone; and rendering the composite image of the third scan zone on the display of the mobile pack.

14. The method of claim 1, further comprising, at a computer system during a fourth time period:

accessing the first sequence of images from the mobile pack;

extracting a first set of tree canopy characteristics of the first set of trees from the first sequence of images;

aggregating the first sequence of images and the first set of tree canopy characteristics into a first three-dimensional representation of the first scan zone;

retrieving an audio feed associated with the first scan zone;

extracting a set of non-speech characteristics from a first segment of the audio feed;

detecting a location-of-interest in the first scan zone from the first segment of the audio feed based on the set of non-speech characteristics; and in response to detecting the location-of-interest in the first scan zone from the first segment of the audio feed:

highlighting a corresponding location in the first scan zone within the first three-dimensional representation of the first scan zone as the location-of-interest; and annotating the location-of-interest within the first three-dimensional representation of the first scan zone with the first segment of the audio feed.

15. A method comprising:

during a first time period, at a mobile pack:

detecting a first location of a user carrying the mobile pack proximal a first scan zone;

capturing a first sequence of images by a set of optical sensors arranged in the mobile pack, the first sequence of images representing a first set of trees in the first scan zone;

characterizing a first coverage density of the first scan zone based on visual features detected in the first sequence of images; and in response to the first coverage density exceeding a threshold coverage density, alerting the user of scan completion of the first scan zone;

during a second time period, at the mobile pack:

detecting a second location of the user proximal a second scan zone;

capturing a second sequence of images representing a second set of trees in the second scan zone by the set of optical sensors;

characterizing a second coverage density of the second scan zone based on visual features detected in the second sequence of images; and in response to the second coverage density falling below the threshold coverage density, prompting the user to increase a speed along a segment of a pathway for a subsequent scan zone; and during a third time period, at a computer system:

accessing an overhead image of the stand of trees;

detecting a set of overhead tree characteristics of the stand of trees based on visual features detected in the overhead image;

interpolating a first set of tree canopy characteristics of a fourth set of trees between the first scan zone and the second scan zone based on visual features detected in the first sequence of images and the second sequence of images; and compiling the set of overhead tree characteristics of the stand of trees and the first set of tree canopy characteristics into a virtual representation of tree characteristics across the stand of trees.

16. The method of claim 15, further comprising, during a fourth time period between the second time period and the third time period:

detecting a third location of the user proximal the third scan zone;

capturing a third sequence of images representing a third set of trees in the third scan zone by the set of optical sensors;

characterizing a third coverage density of the third scan zone based on visual features detected in the third sequence of images; and in response to the third coverage density falling below a second threshold coverage density less than the first threshold coverage density, prompting the user to retraverse the third scan zone for a second attempt.

17. The method of claim 16:

further comprising, during the fourth time period at the mobile pack:

capturing a fourth sequence of images representing the third set of trees in the third scan zone by the set of optical sensors;

characterizing a fourth coverage density of the third scan zone based on visual features detected in the fourth sequence of images; and in response to the fourth coverage density exceeding the threshold coverage density, alerting the user of scan completion of the third scan zone;

further comprising, during the third time period, interpolating a second set of tree canopy characteristics of a fifth set of trees between the second scan zone and the third scan zone based on visual features detected in the second sequence of images and the fourth sequence of images; and wherein compiling the set of overhead tree characteristics of the stand of trees and the first set of tree canopy characteristics into the virtual representation comprises compiling the set of overhead tree characteristics of the stand of trees, the first set of tree canopy characteristics, and the second set of tree canopy characteristics into the virtual representation of tree characteristics across the stand of trees.

18. The method of claim 15:

further comprising, during a third time period at a computer system:

accessing the first sequence of images and the second sequence of images from the mobile pack;

aggregating the first sequence of images into a first three-dimensional representation of the first scan zone; and aggregating the second sequence of images into a second three-dimensional representation of the first scan zone; and wherein compiling the set of overhead tree characteristics of the stand of trees and the first set of tree canopy characteristics into the virtual representation comprises compiling the first three-dimensional representation of the first scan zone and the second three-dimensional representation of the second scan zone into a third three-dimensional representation of the stand of trees.

19. A method comprising:

during a first time period:

detecting a first location of a user carrying a mobile pack proximal a first scan zone;

accessing a first sequence of images representing a first set of trees in the first scan zone and captured by a set of optical sensors arranged within the mobile pack;

characterizing a first coverage density of the first scan zone based on visual features detected in the first sequence of images; and in response to the first coverage density exceeding a threshold coverage density, generating a notification to alert the user of scan completion of the first scan zone; and during a second time period:

detecting a second location of the user proximal a second scan zone;

accessing a second sequence of images representing a second set of trees in the second scan zone and captured by the set of optical sensors;

characterizing a second coverage density of the second scan zone based on visual features detected in the second sequence of images; and in response to the second coverage density falling below the threshold coverage density, prompting the user to increase a traversal speed for a third scan zone.

20. The method of claim 19:

wherein characterizing the first coverage density of the first scan zone comprises calculating an overlap score between each image in the first sequence of images; and wherein generating the notification to alert the user of scan completion of the first scan zone comprises, in response to the overlap score exceeding a threshold overlap score:

generating a notification alerting the user of scan completion of the first scan zone; and serving the notification to the user.

* * * * *